United States Patent
Tamura et al.

(10) Patent No.: US 9,644,276 B2
(45) Date of Patent: May 9, 2017

(54) SEMICONDUCTOR PHOTOELECTRODE, PHOTOELECTROCHEMICAL CELL, HYDROGEN GENERATION METHOD, AND ENERGY SYSTEM

(71) Applicant: Panasonic Intellectual Property Management Co., Ltd., Osaka (JP)

(72) Inventors: Satoru Tamura, Osaka (JP); Kazuhito Hato, Osaka (JP); Takaiki Nomura, Osaka (JP); Takahiro Suzuki, Osaka (JP); Yoshihiro Kozawa, Osaka (JP); Ryosuke Kikuchi, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 163 days.

(21) Appl. No.: 14/509,361

(22) Filed: Oct. 8, 2014

(65) Prior Publication Data
US 2015/0111119 A1    Apr. 23, 2015

(30) Foreign Application Priority Data

Oct. 17, 2013  (JP) ................. 2013-216376

(51) Int. Cl.
| | |
|---|---|
| C25B 1/04 | (2006.01) |
| C25B 9/00 | (2006.01) |
| C25B 11/04 | (2006.01) |
| H01L 31/0687 | (2012.01) |
| C25B 1/00 | (2006.01) |
| H01M 8/0656 | (2016.01) |
| H01M 8/04082 | (2016.01) |

(52) U.S. Cl.
CPC ............... *C25B 1/003* (2013.01); *C25B 1/04* (2013.01); *C25B 11/0452* (2013.01); *C25B 11/0478* (2013.01); *H01M 8/04201* (2013.01); *H01M 8/0656* (2013.01); *Y02E 60/368* (2013.01); *Y02P 20/135* (2015.11)

(58) Field of Classification Search
CPC .... C25B 1/04; C25B 9/00; C25B 9/06; C25B 11/04; C25B 9/12; C25B 9/16
USPC .......................... 136/255; 204/248; 205/340
See application file for complete search history.

(56) References Cited

U.S. PATENT DOCUMENTS

| | | | |
|---|---|---|---|
| 8,236,146 B2 | 8/2012 | Nomura et al. | |
| 2012/0028141 A1* | 2/2012 | Nomura | H01G 9/205 429/422 |
| 2012/0285823 A1* | 11/2012 | Suzuki | C01B 3/042 204/266 |

FOREIGN PATENT DOCUMENTS

WO     2010/050226     5/2010

* cited by examiner

*Primary Examiner* — Zulmariam Mendez
(74) *Attorney, Agent, or Firm* — McDermott Will & Emery LLP

(57) ABSTRACT

Provided is a semiconductor photoelectrode comprising a first conductive layer; a first n-type semiconductor layer disposed on the first conductive layer; and a second conductive layer covering the first n-type semiconductor layer. The first n-type semiconductor layer has a first n-type surface region and a second n-type surface region. The first n-type surface region is in contact with the first conductive layer. The second n-type surface region is in contact with the second conductive layer. The first n-type semiconductor layer is formed of at least one selected from the group consisting of a nitride semiconductor and an oxynitride semiconductor. The second conductive layer is light-transmissive. The second conductive layer is formed of a p-type oxide conductor.

12 Claims, 18 Drawing Sheets

US 9,644,276 B2

SEMICONDUCTOR PHOTOELECTRODE, PHOTOELECTROCHEMICAL CELL, HYDROGEN GENERATION METHOD, AND ENERGY SYSTEM

BACKGROUND

1. Technical Field

The present invention relates to a semiconductor photoelectrode, a photoelectrochemical cell comprising the semiconductor photoelectrode, and an energy system comprising the photoelectrochemical cell. The present invention also relates to a method for generating hydrogen using the photoelectrochemical cell.

2. Description of the Related Art

A semiconductor material which functions as a photocatalyst is irradiated with light to split water into oxygen and hydrogen.

U.S. Pat. No. 8,236,146 discloses a photoelectrochemical cell and energy system using the same. As shown in FIG. 12, the photoelectrochemical cell 900 disclosed in U.S. Pat. No. 8,236,146 includes: a semiconductor electrode 920 including a conductor 921 and an n-type semiconductor layer 922; a counter electrode 930 connected electrically to the conductor 921; an electrolyte 940 in contact with the surfaces of the n-type semiconductor layer 922 and the counter electrode 930; and a container 910 accommodating the semiconductor electrode 920, the counter electrode 930 and the electrolyte 940. The photoelectrochemical cell 900 generates hydrogen by irradiation of the n-type semiconductor layer 922 with light. In the semiconductor electrode 920, relative to the vacuum level, (I) the band edge levels of the conduction band and the valence band in the surface near-field region of the n-type semiconductor layer 922, respectively, are equal to or higher than the band edge levels of the conduction band and the valence band in the junction plane near-field region of the n-type semiconductor layer 922 with the conductor 921, (II) the Fermi level of the junction plane near-field region of the n-type semiconductor layer 922 is higher than the Fermi level of the surface near-field region of the n-type semiconductor layer 922, and (III) the Fermi level of the conductor 921 is higher than the Fermi level of the junction plane near-field region of the n-type semiconductor layer 922.

SUMMARY

The present invention provides a semiconductor photoelectrode, comprising:
a first conductive layer;
a first n-type semiconductor layer disposed on the first conductive layer; and
a second conductive layer covering the first n-type semiconductor layer, wherein
the first n-type semiconductor layer has a first n-type surface region and a second n-type surface region;
the first n-type surface region is in contact with the first conductive layer; the second n-type surface region is in contact with the second conductive layer;
a band edge level $E_{C2a}$ of a conduction band of the first n-type surface region is not higher than a band edge level $E_{C2b}$ of a conduction band of the second n-type surface region;
a band edge level $E_{V2a}$ of a valence band of the first n-type surface region is not higher than a band edge level $E_{V2b}$ of a valence band of the second n-type surface region;
a Fermi level $E_{F2b}$ of the second n-type surface region is not higher than a Fermi level $E_{F2a}$ of the first n-type surface region;
the Fermi level $E_{F2a}$ of the first n-type surface region is lower than a Fermi level $E_{F1}$ of the first conductive layer;
a Fermi level $E_{F3}$ of the second conductive layer is lower than the Fermi level $E_{F2b}$ of the second n-type surface region;
the first n-type semiconductor layer is formed of at least one selected from the group consisting of a nitride semiconductor and an oxynitride semiconductor;
the second conductive layer is light-transmissive; and
the second conductive layer is formed of a p-type oxide conductor.

The present invention further provides a semiconductor photoelectrode, comprising:
a first conductive layer;
a first p-type semiconductor layer disposed on the first conductive layer; and
a second conductive layer covering the first p-type semiconductor layer,
wherein
the first p-type semiconductor layer has a first p-type surface region and a second p-type surface region;
the first p-type surface region is in contact with the first conductive layer;
the second p-type surface region is in contact with the second conductive layer;
a band edge level $E_{C2a}$ of a conduction band of the first p-type surface region is not lower than a band edge level $E_{C2b}$ of a conduction band of the second p-type surface region;
a band edge level $E_{V2a}$ of a valence band of the first p-type surface region is not lower than a band edge level $E_{V2b}$ of a valence band of the second p-type surface region;
a Fermi level $E_{F2b}$ of the second p-type surface region is not lower than a Fermi level $E_{F2a}$ of the first p-type surface region;
the Fermi level $E_{F2a}$ of the first p-type surface region is higher than a Fermi level $E_{F1}$ of the first conductive layer;
a Fermi level $E_{F3}$ of the second conductive layer is higher than the Fermi level $E_{F2b}$ of the second p-type surface region;
the first p-type semiconductor layer is formed of at least one selected from the group consisting of a nitride semiconductor and an oxynitride semiconductor;
the second conductive layer is light-transmissive; and the second conductive layer is formed of a p-type oxide conductor.

The present invention provides a semiconductor photoelectrode capable of maintaining high quantum efficiency for a long term, a photoelectrochemical cell comprising the semiconductor photoelectrode, and an energy system comprising the photoelectrochemical cell. The present invention also provides a method for generating hydrogen using the photoelectrochemical cell.

DETAILED DESCRIPTION OF THE EMBODIMENTS

Hereinafter, the embodiments of the present invention will be described with reference to the drawings.

First Embodiment

Figure 1:
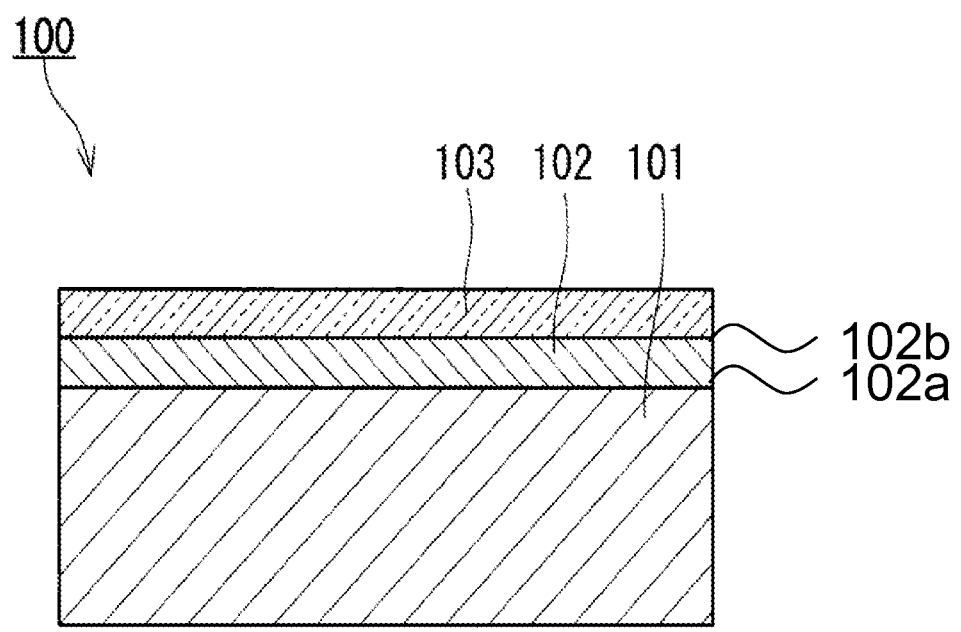
FIG. 1 shows a cross-sectional view of a semiconductor photoelectrode according to the first embodiment.

FIG. 1 shows a cross-sectional view of a semiconductor photoelectrode 100 according to the first embodiment. The semiconductor photoelectrode 100 according to the first embodiment comprises a first conductive layer 101, a first n-type semiconductor layer 102, and a second conductive layer 103, as shown in FIG. 1. The first conductive layer 101 functions as a substrate. The first n-type semiconductor layer 102 is disposed on the first conductive layer 101. The second conductive layer 103 covers the surface of the first n-type semiconductor layer 102. The first n-type semiconductor layer 102 has a first n-type surface region 102a and a second n-type surface region 102b. The first n-type surface region 102a is in contact with the first conductive layer 101. The second n-type surface region 102b is in contact with the second conductive layer 103. Desirably, the second conductive layer 103 completely covers the surface of the first n-type semiconductor layer 102. The phrase "the second conductive layer 103 completely covers the surface of the first n-type semiconductor layer 102" means that the area of the surface portion of the second conductive layer 103 in contact with the second n-type surface region 102b is substantially equal to the surface area of the second n-type surface region 102b.

The second conductive layer 103 is light-transmissive. For this reason, the light reaches the first n-type semiconductor layer 102 through the second conductive layer 103. The phrase "the second conductive layer 103 covers the surface of the first n-type semiconductor layer 102" means that the second conductive layer 103 covers a principal plane of the first n-type semiconductor layer 102. The lateral side of the first n-type semiconductor layer 102 does not have to be covered with the second conductive layer 103. Desirably, the second conductive layer 103 completely covers the principal plane of the first n-type semiconductor layer 102. However, the principal plane of the first n-type semiconductor layer 102 may include a micro region which is not covered with the second conductive layer 103.

The second conductive layer 103 is formed on the outermost surface of the semiconductor photoelectrode 100. The second conductive layer 103 is a dense film formed on the first n-type semiconductor layer 102, and covers the first n-type semiconductor layer 102. For this reason, when the semiconductor photoelectrode 100 is in contact with an electrolyte aqueous solution in order to generate hydrogen by splitting water using light, the second conductive layer 103 separates the first n-type semiconductor layer 102 from the electrolyte aqueous solution in order for the first n-type semiconductor layer 102 not to be in direct contact with the electrolyte aqueous solution. In this way, the first n-type semiconductor layer 102 is prevented from being self-oxidized. "Self-oxidation" is an oxidation reaction caused by the reaction between holes generated by the light excitation on the first n-type semiconductor layer 102 and hydroxyl groups ($OH^-$) derived from water. For this reason, the semiconductor photoelectrode 100 according to the first embodiment has significantly higher long-term stability than a conventional semiconductor photoelectrode in which the semiconductor layer is in direct contact with the electrolyte aqueous solution (i.e., a conventional semiconductor photoelectrode in which the surface of the semiconductor layer is exposed).

In order to use the semiconductor photoelectrode 100 as a semiconductor photoelectrode capable of splitting water by being irradiated with light, it is required that the first conductive layer 101, the first n-type semiconductor layer 102, and the second conductive layer 103 have appropriate relations of their Fermi levels and their band edge levels. In case where the relations of the Fermi levels and the band edge levels are not appropriate, electrons and holes generated on the first n-type semiconductor layer 102 are not separated properly from each other. As a result, since water-splitting reaction fails to occur, the semiconductor photoelectrode 100 fails to serve as a semiconductor photoelectrode. For this reason, in order to prevent the first n-type semiconductor layer 102 from being self-oxidized during the process of the water-splitting reaction, it is required that the first conductive layer 101, the first n-type semiconductor layer 102, and the second conductive layer 103 have the appropriate relations of their Fermi levels and their band edge levels. Hereinafter, described are the appropriate relations of the Fermi levels and the band edge levels in a case where the first n-type semiconductor layer 102 is of n-type.

Figure 2A:
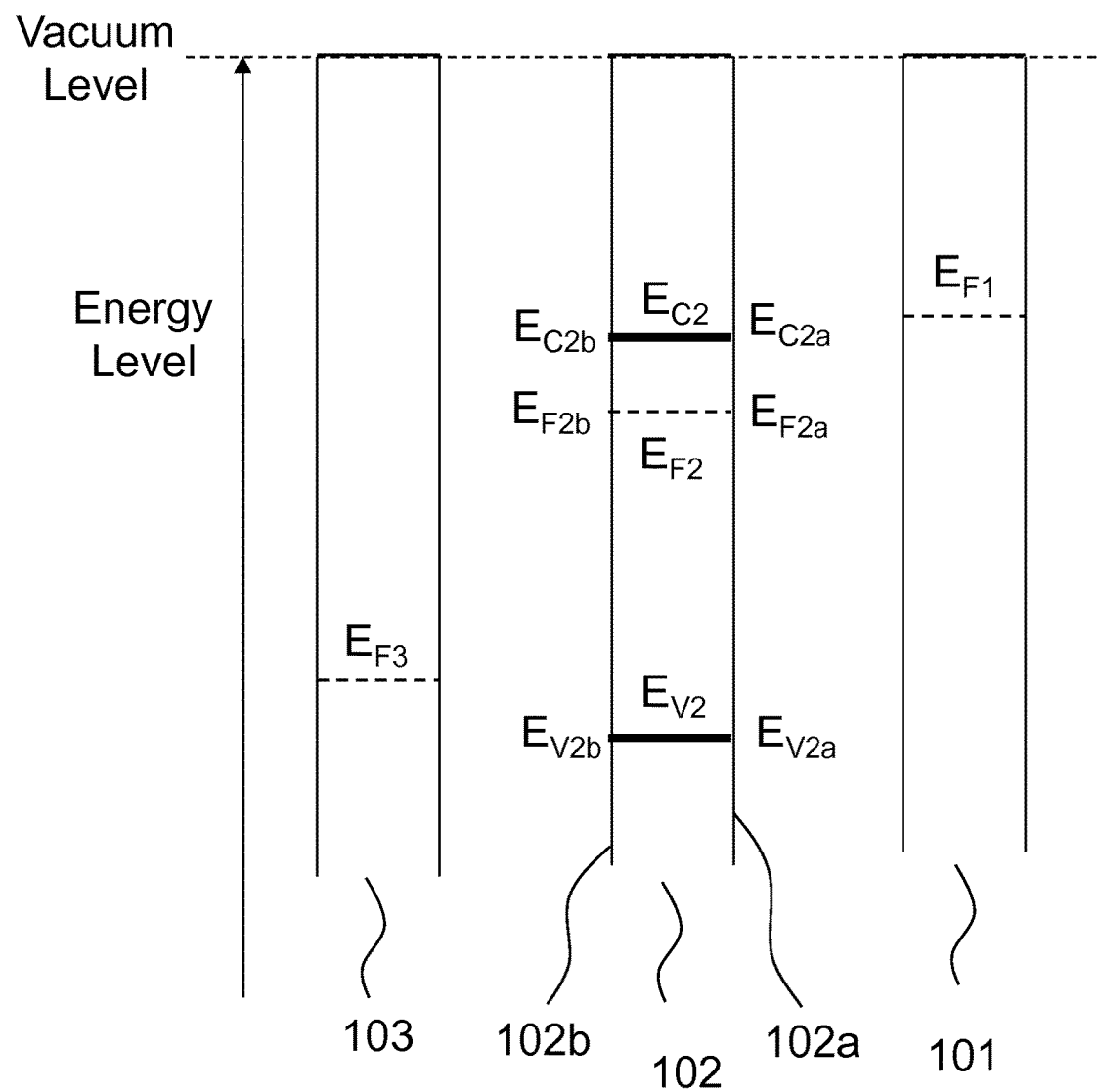
FIG. 2A shows a schematic view of a band structure before a first conductive layer 101, a first n-type semiconductor layer 102 having a uniform composition, and a second conductive layer 103 form junctions.
Figure 2B:
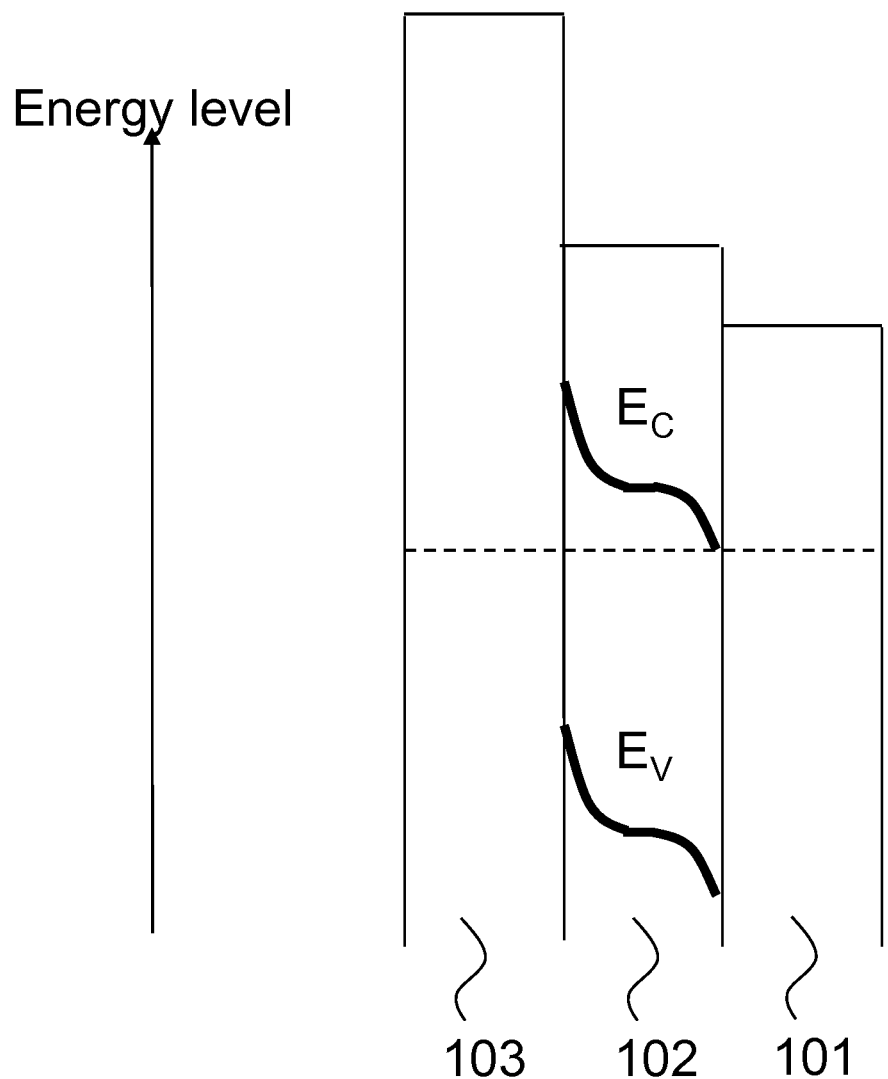
FIG. 2B shows a schematic view of the band structure after the first conductive layer 101, the first n-type semiconductor layer 102 having a uniform composition, and the second conductive layer 103 have formed junctions.

FIG. 2A shows a schematic view of the band structure before the first conductive layer 101, the first n-type semiconductor layer 102, and the second conductive layer 103 form junctions. FIG. 2B shows a schematic view of the band structure after the first conductive layer 101, the first n-type semiconductor layer 102, and the second conductive layer 103 have formed junctions. In the instant specification, a vacuum level is used as a reference against all the energy levels.

Hereinafter, the present inventors suppose that the first n-type semiconductor layer 102 has a uniform composition. For this reason, regardless of the position in the first n-type semiconductor layer 102, the Fermi level is constant. Similarly, the band edge level of the conduction band is constant, too. The band edge level of the conduction band of the valence band is constant, too. In other words, the Fermi level $E_{F2a}$ of the first n-type surface region 102a is same as the Fermi level $E_{F2b}$ of the second n-type surface region 102b. The band edge level $E_{G2a}$ of the conduction band of the first n-type surface region 102a is same as the band edge level $E_{G2b}$ of the conduction band of the second n-type surface region 102b. The band edge level $E_{V2a}$ of the valence band of the first n-type surface region 102a is same as the band edge level $E_{V2b}$ of the valence band of the second n-type surface region 102b.

The Fermi level $E_{F2}$ of the first n-type semiconductor layer 102 is lower than the Fermi level $E_{F1}$ of the first conductive layer 101, as shown in FIG. 2A. The Fermi level $E_{F3}$ of the second conductive layer 103 is lower than the Fermi level $E_{F2}$ of the first n-type semiconductor layer 102. In other words, the energy difference between the vacuum level and the Fermi level $E_{F1}$ of the first conductive layer 101 is smaller than the energy difference between the vacuum level and the Fermi level $E_{F2}$ of the first n-type semiconductor layer 102. The energy difference between the vacuum level and the Fermi level $E_{F3}$ of the second conductive layer 103 is greater than the energy difference between the vacuum level and the Fermi level $E_{F2}$ of the first n-type semiconductor layer 102.

When such first conductive layer 101, first n-type semiconductor layer 102, and second conductive layer 103 form junctions, carriers migrate in such a manner that these Fermi levels are in accord with one another at the junctions. As a result, a band bending shown in FIG. 2B occurs. No Schottky barrier occurs at the interface between the first conductive layer 101 and the first n-type semiconductor layer 102. The first conductive layer 101 and the first n-type semiconductor layer 102 form an ohmic contact. For this reason, the electrons are not prevented from migrating from the first n-type semiconductor layer 102 to the first conductive layer 101.

Holes are also not prevented from migrating from the first n-type semiconductor layer 102 to the second conductive layer 103. For this reason, the holes generated due to the photoexcitation in the first n-type semiconductor layer 102 migrate from the first n-type semiconductor layer 102 to the second conductive layer 103. Furthermore, the holes reach the outermost surface of the second conductive layer 103 through the inside of the second conductive layer 103. Finally, the holes react with water at the outermost surface of the second conductive layer 103.

As just described, when the first conductive layer 101, the first n-type semiconductor layer 102, and the second conductive layer 103 satisfy the above-mentioned appropriate relations of their Fermi levels and their band edge levels, electrons and holes generated due to the photoexcitation are separated efficiently from each other in the semiconductor photoelectrode 100.

Next, the first conductive layer 101, the first n-type semiconductor layer 102, and the second conductive layer 103 will be described.

(First Conductive Layer 101)

The material of the first conductive layer 101 is not limited, as far as the Fermi level $E_{F2}$ of the first n-type semiconductor layer 102 is lower than the Fermi level $E_{F1}$ of the first conductive layer 101. Since light is incident on the light-transmissive second conductive layer 103, the first conductive layer 101 does not have to be light-transmissive. In the first embodiment, the first conductive layer 101 has a thickness of not less than approximately 0.1 millimeters and not more than approximately 0.3 millimeters. The first conductive layer 101 may serve as a substrate for supporting the first n-type semiconductor layer 102 and the second conductive layer 103. An example of the first conductive layer 101 is a metal plate. Instead, for example, the first conductive layer 101 may be formed by providing a metal layer on a resin substrate. In this case, the metal layer may have a thickness of not less than approximately 2 micrometers and not more than 3 micrometers.

As is described later, the first n-type semiconductor layer 102 is formed of at least one selected from the group consisting of a nitride semiconductor and an oxynitride semiconductor. From the viewpoint of the relation between the Fermi level of the first conductive layer 101 and the Fermi level of the first n-type semiconductor layer 102, it is desirable that an example of the material of the first conductive layer 101 is a metal having a low work function such as Ti, Nb, or Ta, or a metal nitride having a low work function.

The first conductive layer 101 does not have to be light-transmissive. When the first conductive layer 101 is required to be light-transmissive, a transparent conductive substrate is required to be used as the first conductive layer 101. This raises material costs. However, since the first conductive layer 101 does not have to be light-transmissive, an example of the material of the first conductive layer 101 may be an opaque material such as a metal. For this reason, the semiconductor photoelectrode according to the first embodiment is more reasonable than a semiconductor photoelectrode comprising a transparent conductive substrate.

(First n-Type Semiconductor Layer 102)

A material of the first n-type semiconductor layer 102 has a band structure suitable for the formation of an ohmic contact with the first conductive layer 101 and for the reaction generated on the semiconductor photoelectrode 100. For example, when the semiconductor photoelectrode 100 is used for water splitting, the first n-type semiconductor layer 102 is formed of a semiconductor material having a bottom of the conduction band of not more than 0 volts and having a top of the valence band of not less than 1.23 volts so as to generate hydrogen by splitting water. Note that the standard reduction potential of water is 0 volts and that the standard oxidation potential of water is 1.23 volts. Specifically, the first n-type semiconductor layer 102 is formed of at least one selected from the group consisting of a nitride semiconductor and an oxynitride semiconductor. Desirably, the nitride semiconductor or the oxynitride semiconductor contains at least one kind of element selected from the group consisting of Ti, Nb and Ta. Such a material allows visible light to be absorbed by the first n-type semiconductor layer 102. The semiconductor photoelectrode 100 is capable of splitting water using light such as sunlight.

A specific example in which the first conductive layer 101 and the first n-type semiconductor layer 102 form an ohmic contact (the first n-type semiconductor layer 102/the first conductive layer 101) is $Nb_3N_5/Ti$, $Nb_3N_5/Nb$, $Nb_3N_5/Ta$, $Ta_3N_5/Ti$, $Ta_3N_5/Nb$, $Ta_3N_5/Ta$, NbON/Ti, NbON/Nb, NbON/Ta, TaON/Ti, TaON/Nb, or TaON/Ta.

The thickness of the first n-type semiconductor layer 102 is not limited. However, desirably, the first n-type semiconductor layer 102 has a thickness of not less than 0.1 micrometers and not more than 2 micrometers. When the first n-type semiconductor layer 102 has a thickness within such a range, the incident light is sufficiently absorbed by the first n-type semiconductor layer 102, and the migration distance of the electrons and holes separated from each other in the first n-type semiconductor layer 102 is not greater than necessary. For this reason, the electrons and holes generated in the first n-type semiconductor layer 102 migrate to the first conductive layer 101 and the second conductive layer 103, respectively, without being recombined with each other. In this way, the efficiency of the semiconductor photoelectrode 100 is improved.

(Second Conductive Layer 103)

The second conductive layer 103 is formed of a p-type oxide conductor and is light-transmissive. An example of the material of the second conductive layer 103 is p-type nickel oxide, p-type copper oxide, p-type cobalt oxide, p-type zinc oxide, p-type $CuNbO_3$, p-type $SrCu_2O_2$, p-type BaCuSeF, or p-type $CuAlO_2$. Since such a p-type oxide conductor is used, holes generated in the first n-type semiconductor layer 102 due to the photoexcitation reach the outermost surface of the second conductive layer 103 efficiently through the inside of the second conductive layer 103. This allows the efficiency of the water-splitting reaction to be further improved. Since the second conductive layer 103 prevents the first n-type semiconductor layer 102 from being in contact with an electrolyte aqueous solution, the semiconductor photoelectrode 100 according to the first embodiment has significantly improved long-term stability.

The holes generated in the first n-type semiconductor layer 102 migrate to the second conductive layer 103. However, in case where the second conductive layer 103 is of n-type, the holes which have reached the second conductive layer 103 are recombined with electrons included in the n-type second conductive layer 103 to disappear. As a result, water is not split.

The thickness and the crystallinity of the second conductive layer 103 are adjusted in order for the efficiency of water-splitting reaction to improve. Hereinafter, this will be described in more detail.

First, the influence of the thickness of the second conductive layer 103 on the semiconductor photoelectrode 100 will be described.

As the thickness of the second conductive layer 103 is increased, the second conductive layer 103 prevents the first n-type semiconductor layer 102 from being in contact with the electrolyte aqueous solution more efficiently. As a result, the long-term stability of the semiconductor photoelectrode 100 is improved furthermore.

However, the migration distance of the carriers in the second conductive layer 103 increases with an increase in the thickness of the second conductive layer 103. This causes a problem that the carriers deactivate due to the trap to a defect level or due to the recombination. As a result, ratio of the carriers which contribute the water-splitting reaction to the carriers which have been photoexcited is lowered.

When the second conductive layer 103 has a property of absorbing light, the ratio of light to be absorbed by the second conductive layer 103 to light incident on the semiconductor photoelectrode 100 is raised with an increase in the thickness of the second conductive layer 103, and the amount of the light to be absorbed by the first n-type semiconductor layer 102 is decreased. As a result, the amount of the carriers generated in the first n-type semiconductor layer 102 is decreased.

As just described, there is a contradiction between the improvements of the long-term stability of the semiconductor photoelectrode 100 and the water-splitting efficiency by adjustment of the thickness of the second conductive layer 103. For this reason, in order to realize both the high long-term stability and the high water-splitting efficiency, the thickness of the second conductive layer 103 is set ideally. As is described later, the water-splitting efficiency relates to the crystallinity of the second conductive layer 103. For this reason, the suitable adjustment of the thickness of the second conductive layer 103 does not always lead directly to realization of both the high long-term stability and the high water-splitting efficiency. As one example, desirably, the second conductive layer 103 has a thickness of not less than 1 nanometer and not more than 50 nanometers. More desirably, the second conductive layer 103 has a thickness of not less than 5 nanometers and not more than 20 nanometers.

Next, the crystallinity of the second conductive layer 103 will be described. Diffusion length of the carriers is used as an index for evaluating the distance that the carriers travel in the second conductive layer 103 without deactivating. Generally, the diffusion length of the carriers gets longer with an improvement of the crystallinity of the second conductive layer 103. In other words, a second conductive layer 103 having high crystallinity has the same long-term stability as and longer diffusion length of the carriers than a second conductive layer 103 having the same thickness and low crystallinity. For this reason, the high water-splitting efficiency is accomplished.

As just described, the thickness and crystallinity of the second conductive layer 103 have a lot of influence on the property of the semiconductor photoelectrode 100. For this reason, in order to obtain a higher effect, it is desirable that the thickness and crystallinity of the second conductive layer 103 are adjusted.

From the viewpoint of the diffusion length of the carriers, namely, in order to cause the carriers to migrate to the outermost surface of the second conductive layer 103 without deactivating the carriers as much as possible, it is desirable that the second conductive layer 103 has a thickness of not more than 0.01 micrometers. It is more desirable that the second conductive layer 103 has a thickness of not more than 0.005 micrometers. On the other hand, from the viewpoint of prevent pinholes from being generated when the second conductive layer 103 is formed, for example, in a case where the second conductive layer 103 is formed by an atomic layer deposition method (hereinafter, referred to as "ALD method", it is desirable that the second conductive layer 103 has a thickness of not more than 0.05 micrometers. It is more desirable that the second conductive layer 103 has a thickness of not more than 0.01 micrometers. In a case where the second conductive layer 103 is formed by a sputtering method, it is desirable that the second conductive layer 103 has a thickness of not more than 0.05 micrometers. It is more desirable that the second conductive layer 103 has a thickness of not more than 0.02 micrometers.

From the viewpoint of the improvement of the crystallinity of the second conductive layer 103, a desirable method for forming the second conductive layer 103 is an ALD method or a sputtering method. From the viewpoint of the costs for forming the second conductive layer 103, a desirable method for forming the second conductive layer 103 is a sputtering method.

The present inventors suppose that the first n-type semiconductor layer 102 has a uniform composition in FIG. 2A and FIG. 2B. Instead, the first n-type semiconductor layer 102 may have a band gradient. In other words, the band edge level of the conduction band, the band edge level of the valence band, and the Fermi level may change along a thickness direction of the first n-type semiconductor layer 102. Such a first n-type semiconductor layer 102 will be described with reference to FIG. 4A, FIG. 4B, FIG. 5A, and FIG. 5B.

Figure 4A:
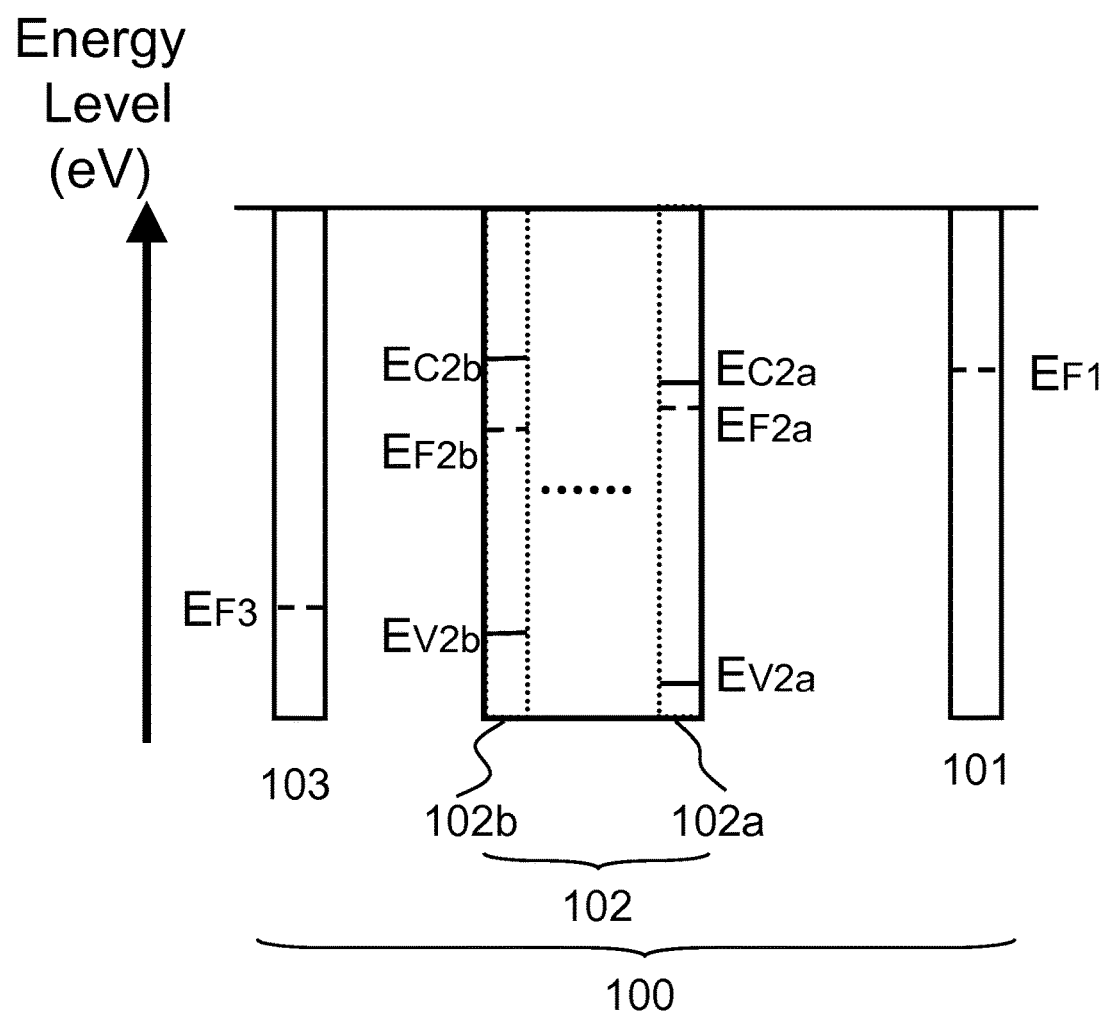
FIG. 4A shows a schematic view of the band structure before the first conductive layer 101, the first n-type semiconductor layer 102 having a band gradient, and the second conductive layer 103 form junctions.
Figure 4B:
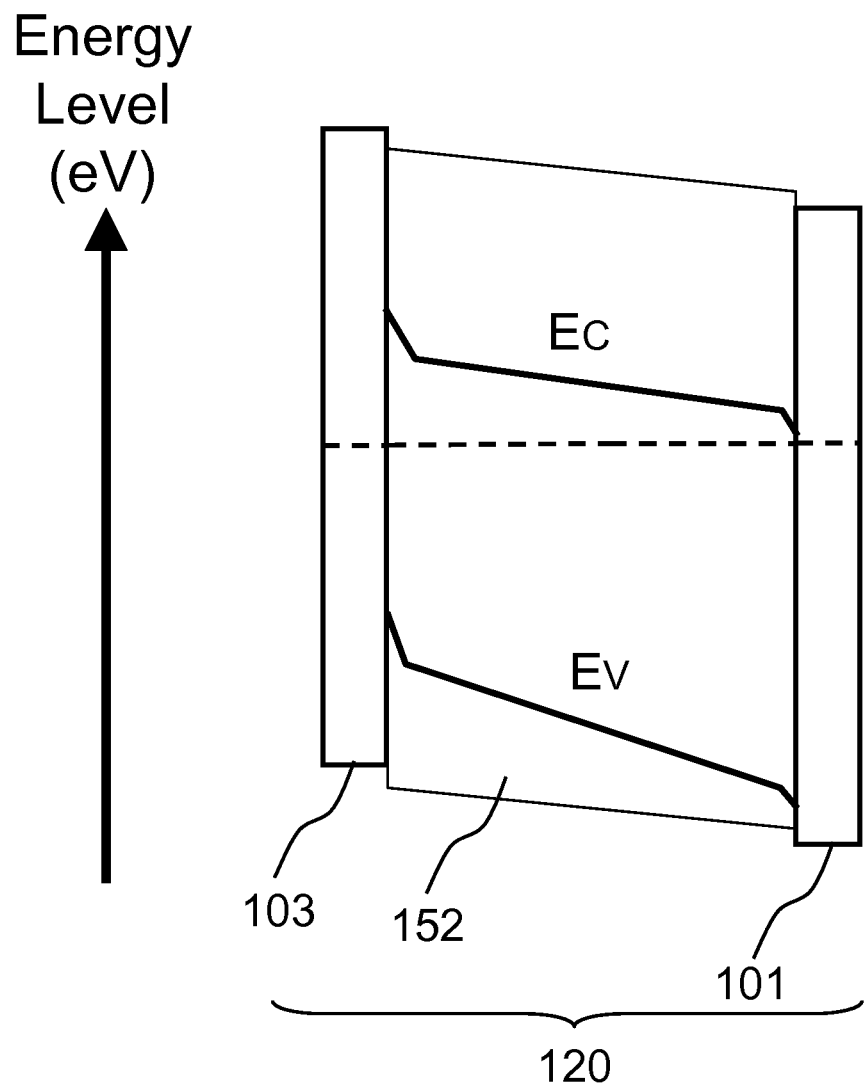
FIG. 4B shows a schematic view of the band structure after the first conductive layer 101, the first n-type semiconductor layer 102 having a band gradient, and the second conductive layer 103 have formed junctions.

FIG. 4A and FIG. 4B show appropriate relations of the Fermi levels and the band edge levels in a case where the first n-type semiconductor layer 102 having a band gradient is used. FIG. 4A shows a schematic view of the band structure before the first conductive layer 101, the first n-type semiconductor layer 102 having a band gradient, and the second conductive layer 103 form junctions. FIG. 4B shows a schematic view of the band structure after the first conductive layer 101, the first n-type semiconductor layer 102 having a band gradient, and the second conductive layer 103 have formed junctions.

The appropriate relations of the Fermi levels and the band edge levels as shown in FIG. 4A are listed below.

The band edge level $E_{C2a}$ of the conduction band of the first n-type surface region 102a is lower than the band edge level $E_{G2b}$ of the conduction band of the second n-type surface region 102b.

The band edge level $E_{V2a}$ of the valence band of the first n-type surface region 102a is lower than the band edge level $E_{V2b}$ of the valence band of the second n-type surface region 102b.

The Fermi level $E_{F2b}$ of the second n-type surface region 102b is lower than the Fermi level $E_{F2a}$ of the first n-type surface region 102a.

The Fermi level $E_{F2a}$ of the first n-type surface region 102a is lower than the Fermi level $E_{F1}$ of the first conductive layer 101.

The Fermi level $E_{F3}$ of the second conductive layer 103 is lower than the Fermi level $E_{F2b}$ of the second n-type surface region 102b.

After the first conductive layer 101, the first n-type semiconductor layer 102, and the second conductive layer 103 have formed junctions, carriers migrate in such a manner that their Fermi levels are in accord with one another at the interfaces. As a result, the band bending shown in FIG. 4B occurs. For this reason, such a semiconductor photoelectrode 100 also has an effect similar to the effect of the semiconductor photoelectrode 100 having the first n-type semiconductor layer 102 having a uniform composition as shown in FIG. 2A and FIG. 2B.

Furthermore, electrons and holes generated in the first n-type semiconductor layer 102 due to the photoexcitation are separated from each other more efficiently in a case where the first n-type semiconductor layer 102 has a band gradient as shown in FIG. 4A and FIG. 4B than in a case where the first n-type semiconductor layer 102 has a uniform composition as shown in FIG. 2A and FIG. 2B.

The first n-type semiconductor layer 102 having a band gradient may be formed, for example, by increasing or decreasing the concentration of at least one kind of element contained in the first n-type semiconductor layer 102 along a thickness direction of the first n-type semiconductor layer 102.

In FIG. 4A, the band edge level $E_{C2a}$ of the conduction band of the first n-type surface region 102a is lower than the band edge level $E_{C2b}$ of the conduction band of the second n-type surface region 102b. In FIG. 2A, the band edge level $E_{C2a}$ of the conduction band of the first n-type surface region 102a is same as the band edge level $E_{C2b}$ of the conduction band of the second n-type surface region 102b. For this reason, the band edge level $E_{C2a}$ of the conduction band of the first n-type surface region 102a is not higher than the band edge level $E_{C2b}$ of the conduction band of the second n-type surface region 102b in the first embodiment.

Similarly, in FIG. 4A, the band edge level $E_{V2a}$ of the valence band of the first n-type surface region 102a is lower than the band edge level $E_{V2b}$ of the valence band of the second n-type surface region 102b. In FIG. 2A, the band edge level $E_{V2a}$ of the valence band of the first n-type surface region 102a is same as the band edge level $E_{V2b}$ of the valence band of the second n-type surface region 102b. For this reason, the band edge level $E_{V2a}$ of the valence band of the first n-type surface region 102a is not higher than the band edge level $E_{V2b}$ of the valence band of the second n-type surface region 102b in the first embodiment.

In FIG. 4A, the Fermi level $E_{F2b}$ of the second n-type surface region 102b is lower than the Fermi level $E_{F2a}$ of the first n-type surface region 102a. In FIG. 2A, the Fermi level $E_{F2b}$ of the second n-type surface region 102b is same as the Fermi level $E_{F2a}$ of the first n-type surface region 102a. For this reason, the Fermi level $E_{F2b}$ of the second n-type surface region 102b is not higher than the Fermi level $E_{F2a}$ of the first n-type surface region 102a in the first embodiment.

Second Embodiment

In the second embodiment, a first p-type semiconductor layer 152 is used instead of the first n-type semiconductor layer 102. For this reason, the magnitude relations of the Fermi levels and the band edge levels described in the first embodiment are inverted in the second embodiment. The appropriate relations of the Fermi levels and the band edge levels in the second embodiment will be listed below.

The band edge level $E_{C2a}$ of the conduction band of the first n-type surface region 102a is not lower than the band edge level $E_{C2b}$ of the conduction band of the second n-type surface region 102b.

The band edge level $E_{V2a}$ of the valence band of the first n-type surface region 102a is not lower than the band edge level $E_{V2b}$ of the valence band of the second n-type surface region 102b.

The Fermi level $E_{F2b}$ of the second n-type surface region 102b is not lower than the Fermi level $E_{F2a}$ of the first n-type surface region 102a.

The Fermi level $E_{F2a}$ of the first n-type surface region 102a is higher than the Fermi level $E_{F1}$ of the first conductive layer 101.

The Fermi level $E_{F3}$ of the second conductive layer 103 is higher than the Fermi level $E_{F2b}$ of the second n-type surface region 102b.

Figure 3A:
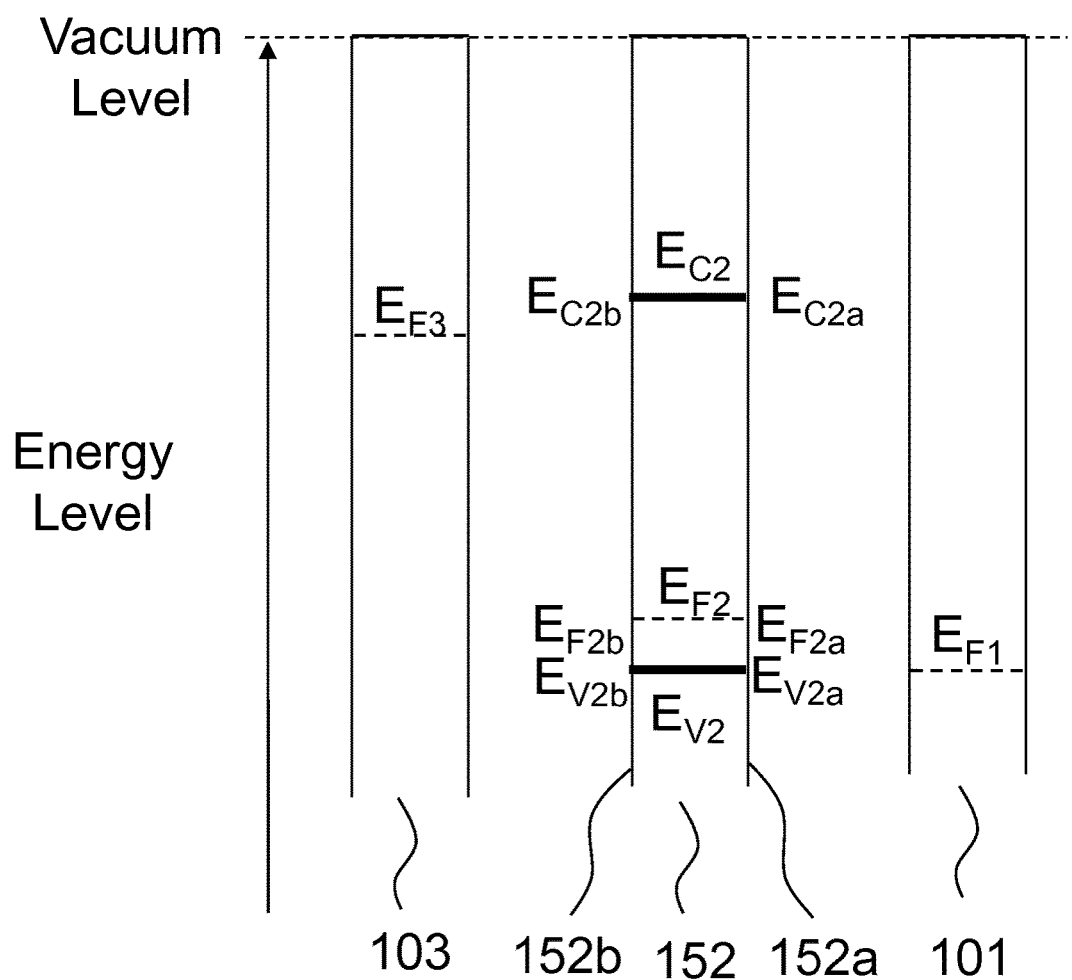
FIG. 3A is a schematic view of the band structure before the first conductive layer 101, a first p-type semiconductor layer 152 having a uniform composition, and the second conductive layer 103 form junctions in the second embodiment.
Figure 3B:
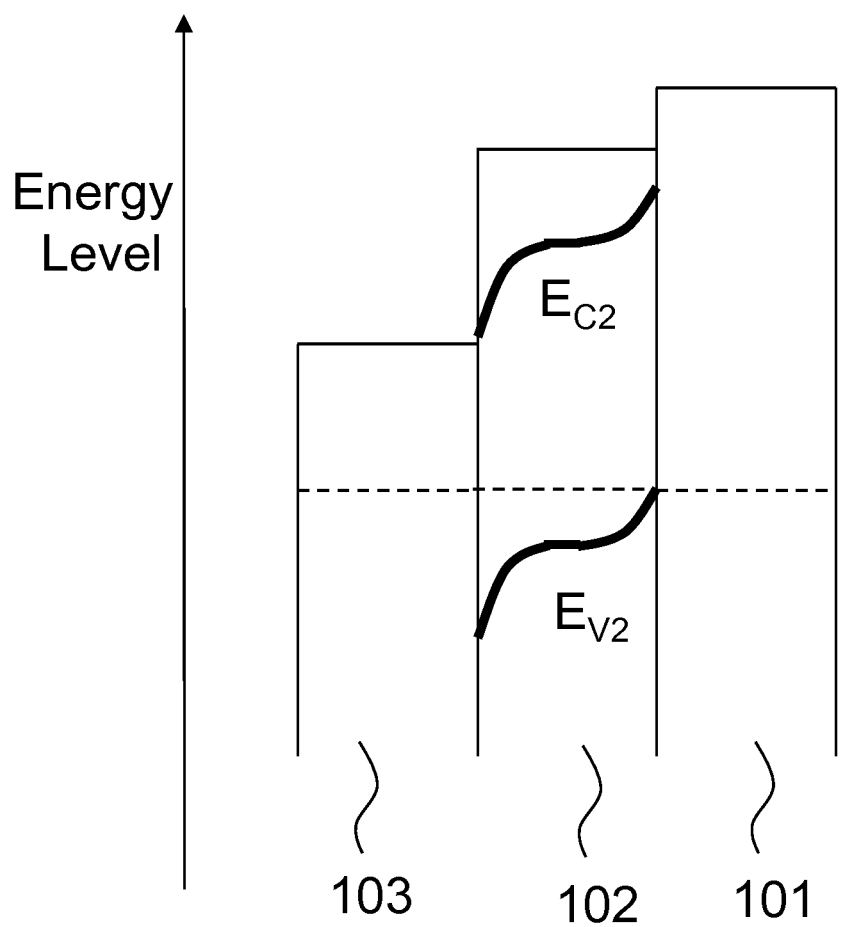
FIG. 3B is a schematic view of the band structure after the first conductive layer 101, the first p-type semiconductor layer 152 having a uniform composition, and the second conductive layer 103 have formed junctions in the second embodiment.

FIG. 3A is a schematic view of the band structure before the first conductive layer 101, the first p-type semiconductor layer 152, and the second conductive layer 103 form junctions in the second embodiment. FIG. 3B is a schematic view of the band structure after the first conductive layer 101, the first p-type semiconductor layer 152, and the second conductive layer 103 have formed junctions in the second embodiment. FIG. 3A and FIG. 3B correspond to FIG. 2A and FIG. 2B, respectively. Since the first p-type semiconductor layer 152 has a uniform composition in FIG. 3A and FIG. 3B, the band edge level $E_{C2a}$ of the conduction band, the band edge level $E_{V2a}$ of the valence band, and the Fermi level $E_{F2a}$ of the first n-type surface region 102a are same as the band edge level $E_{G2b}$ of the conduction band, the band edge level $E_{V2b}$ of the valence band, and the Fermi level $E_{F2b}$ of the second n-type surface region 102b, respectively. Similarly to the case of the first n-type semiconductor layer 102, as shown in FIG. 3A, the first p-type semiconductor layer 152 also has a first p-type surface region 152a and a second p-type surface region 152b. The first p-type surface region 152a is in contact with the first conductive layer 101. The second p-type surface region 152b is in contact with the second conductive layer 103.

Figure 5A:
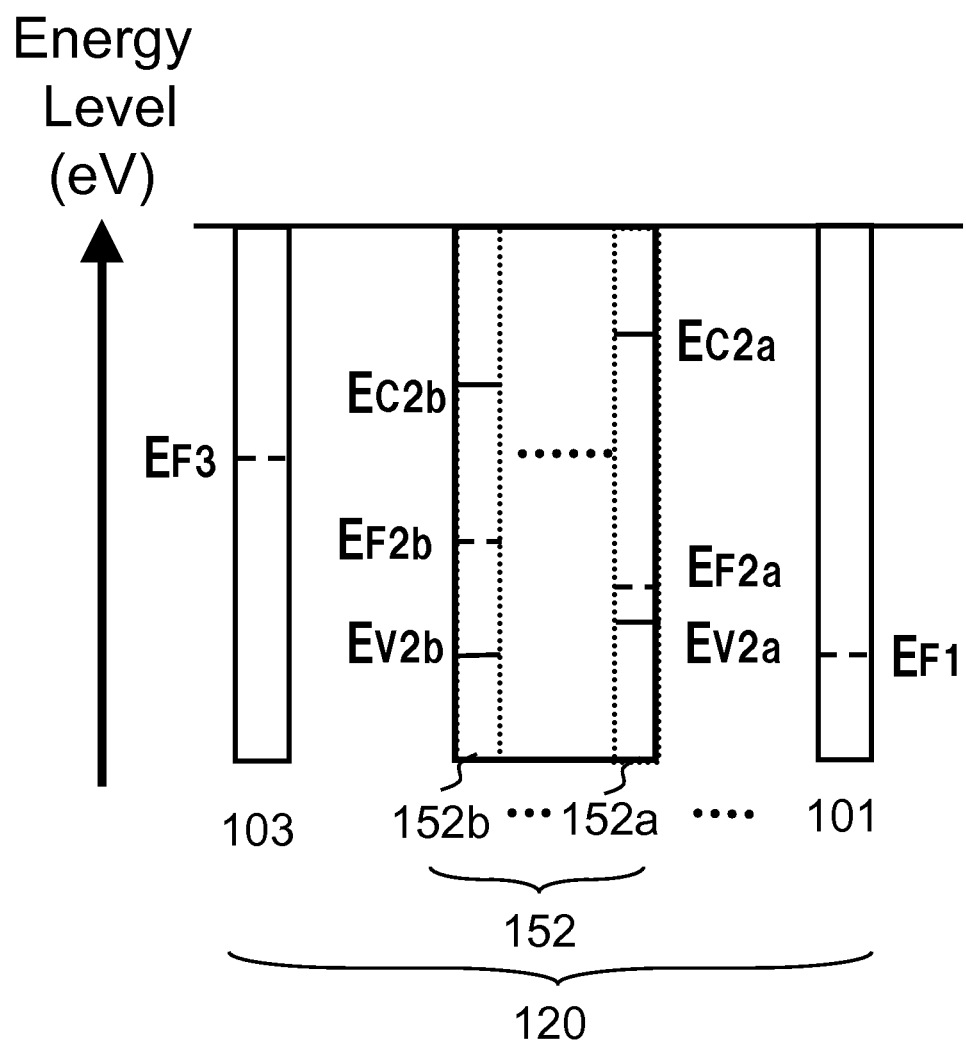
FIG. 5A shows a schematic view of the band structure before the junctions are formed in a case where the first p-type semiconductor layer 152 has a band gradient in the second embodiment.
Figure 5B:
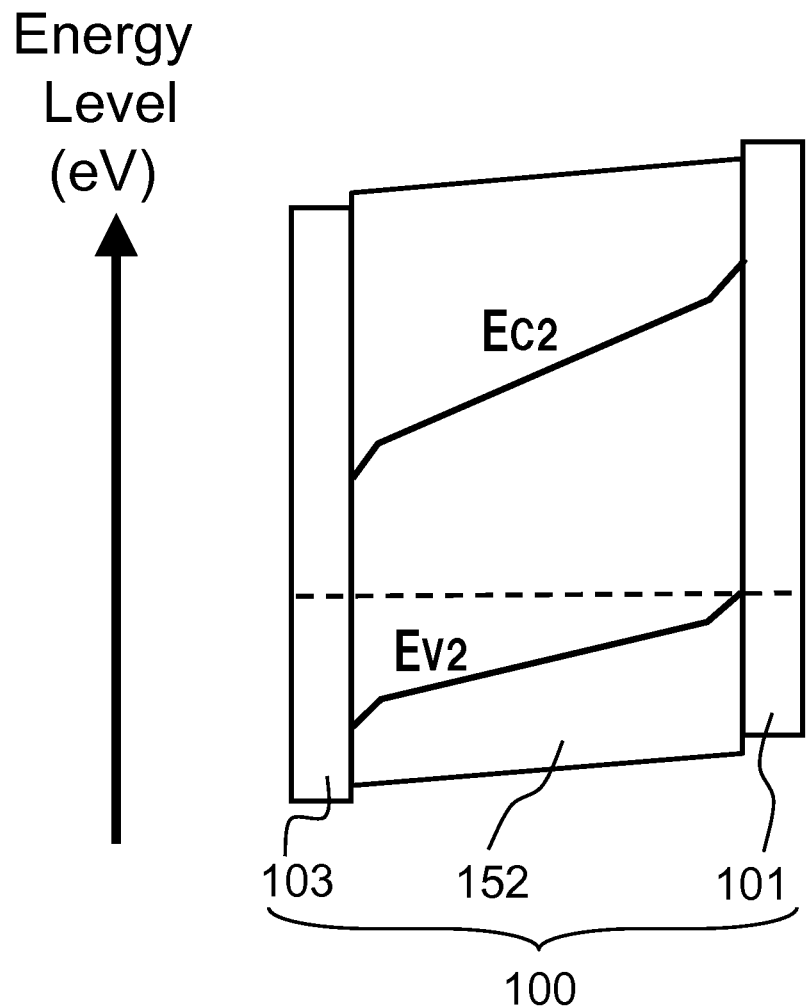
FIG. 5B shows a schematic view of the band structure after the junctions have been formed in a case where the first p-type semiconductor layer 152 has a band gradient in the second embodiment.

FIG. 5A shows a schematic view of the band structure before the junctions are formed in a case where the first p-type semiconductor layer 152 has a band gradient in the second embodiment. FIG. 5B shows a schematic view of the band structure after the junctions have been formed in a case where the first p-type semiconductor layer 152 has a band gradient in the second embodiment. FIG. 5A and FIG. 5B correspond to FIG. 4A and FIG. 4B, respectively. Since the first p-type semiconductor layer 152 has a band gradient in FIG. 5A and FIG. 5B, the band edge level $E_{C2a}$ of the conduction band and the band edge level $E_{V2a}$ of the valence band of the first n-type surface region 102a are higher than the band edge level $E_{C2b}$ of the conduction band and the band edge level $E_{V2b}$ of the valence band of the second n-type surface region 102b, respectively. The Fermi level $E_{F2b}$ of the second n-type surface region 102b is higher than the Fermi level $E_{F2a}$ of the first n-type surface region 102a.

Third Embodiment

Figure 6:
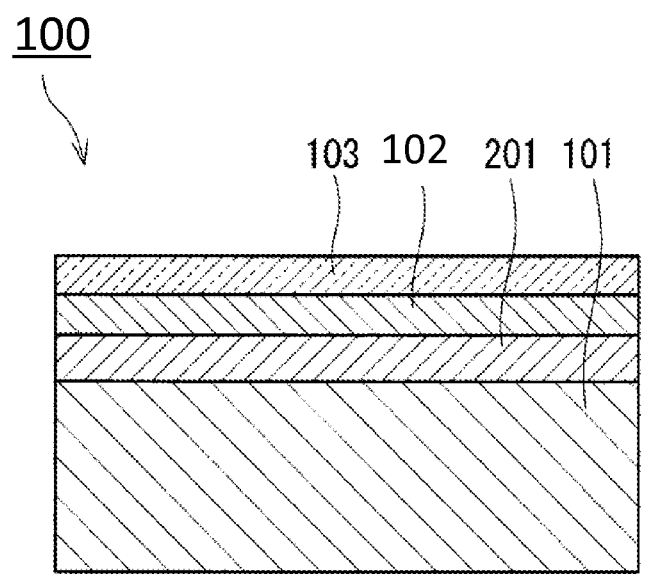
FIG. 6 shows a cross-sectional view of a semiconductor photoelectrode 100 according to the third embodiment.

FIG. 6 shows a cross-sectional view of the semiconductor photoelectrode 100 according to the third embodiment. The semiconductor photoelectrode 100 according to the third embodiment comprises a second n-type semiconductor layer 201. The second n-type semiconductor layer 201 is interposed between the first conductive layer 101 and the first n-type semiconductor layer 102.

Similarly to the case of the semiconductor photoelectrode 100 according to the first embodiment, also in the third embodiment, in order to split water by being irradiated with light, it is required that the first conductive layer 101, the first n-type semiconductor layer 102, the second n-type semiconductor layer 201, and the second conductive layer 103 have appropriate relations of their Fermi levels and their band edge levels as below.

Figure 7A:
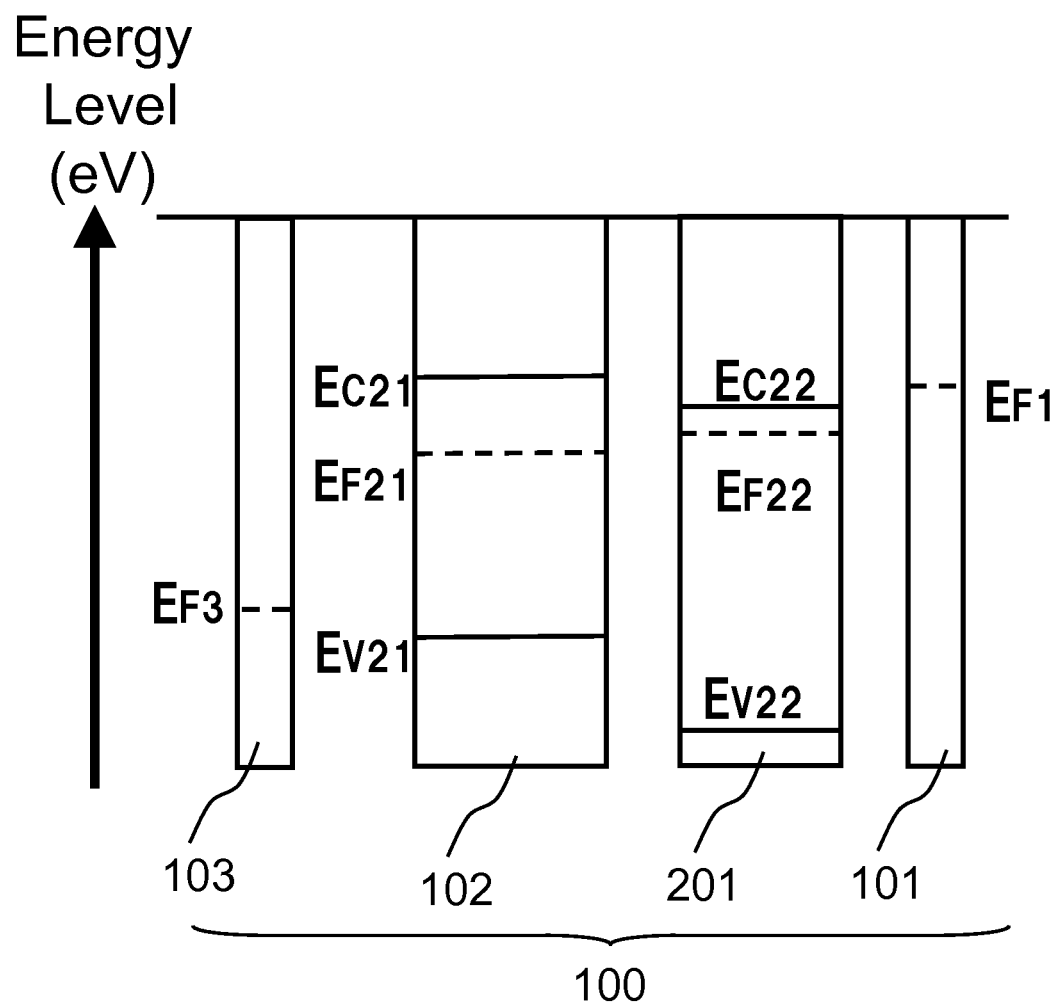
FIG. 7A shows a schematic view of the band structure before the first conductive layer 101, the first n-type semiconductor layer 102, a second n-type semiconductor layer 201, and the second conductive layer 103 form junctions in the third embodiment.
Figure 7B:
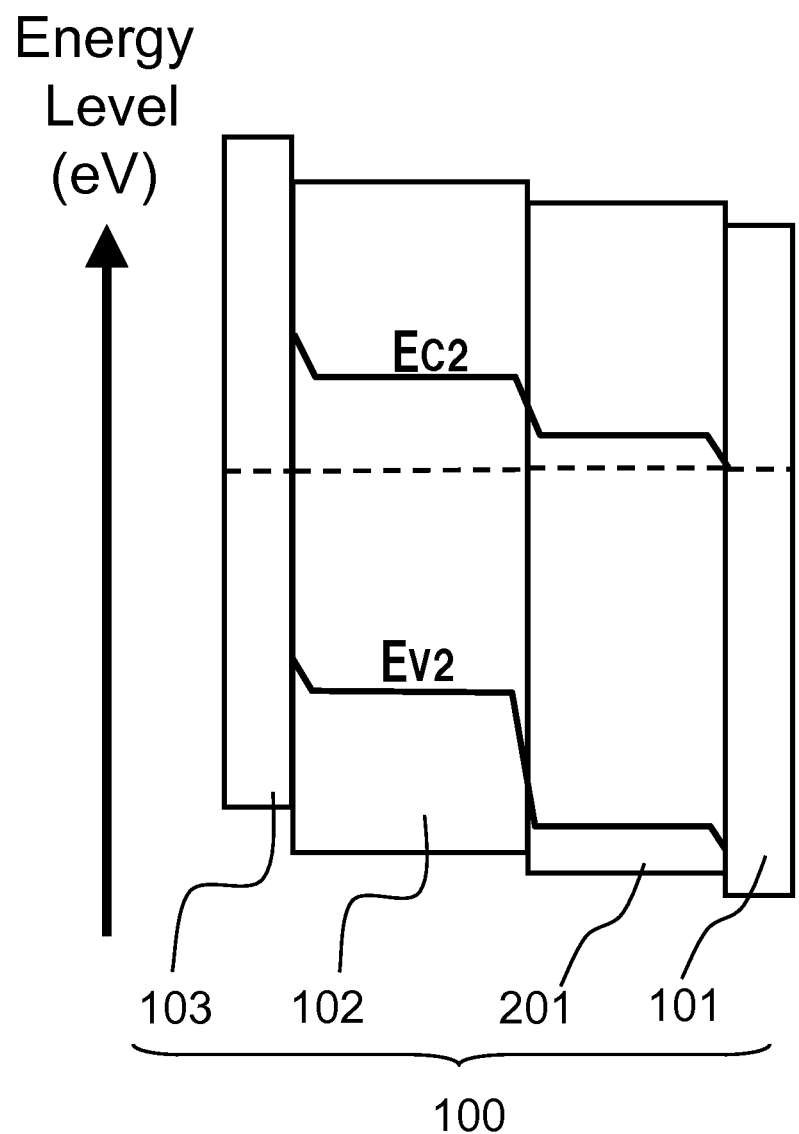
FIG. 7B shows a schematic view of the band structure after the first conductive layer 101, the first n-type semiconductor layer 102, the second n-type semiconductor layer 201, and the second conductive layer 103 have formed junctions in the third embodiment.

FIG. 7A shows a schematic view of the band structure before the first conductive layer 101, the first n-type semiconductor layer 102, the second n-type semiconductor layer 201, and the second conductive layer 103 form junctions in the third embodiment. FIG. 7B shows a schematic view of the band structure after the first conductive layer 101, the first n-type semiconductor layer 102, the second n-type semiconductor layer 201, and the second conductive layer 103 have formed junctions in the third embodiment.

The appropriate relations of the Fermi levels and the band edge levels in the third embodiment as shown in FIG. 7A will be listed below.

The band edge level $E_{C22}$ of the conduction band of the second n-type semiconductor layer 201 is lower than the band edge level $E_{C21}$ of the conduction band of the first n-type semiconductor layer 102.

The band edge level $E_{V22}$ of the valence band of the second n-type semiconductor layer 201 is lower than the band edge level $E_{V21}$ of the valence band of the first n-type semiconductor layer 102.

The Fermi level $E_{F21}$ of the first n-type semiconductor layer 102 is lower than the Fermi level $E_{F22}$ of the second n-type semiconductor layer 201.

The Fermi level $E_{F22}$ of the second n-type semiconductor layer 201 is lower than the Fermi level $E_{F1}$ of the first conductive layer 101.

The Fermi level $E_{F3}$ of the second conductive layer 103 is lower than the Fermi level $E_{F21}$ of the first n-type semiconductor layer 102.

In other words,

The energy difference between the vacuum level and the band edge level $E_{G22}$ of the conduction band of the second n-type semiconductor layer 201 is greater than the energy difference between the vacuum level and the band edge level $E_{G21}$ of the conduction band of the first n-type semiconductor layer 102.

The energy difference between the vacuum level and the band edge level $E_{V22}$ of the valence band of the second n-type semiconductor layer 201 is greater than the energy difference between the vacuum level and the band edge level $E_{V21}$ of the valence band of the first n-type semiconductor layer 102.

The energy difference between the vacuum level and the Fermi level $E_{F21}$ of the first n-type semiconductor layer 102 is greater than the energy difference between the vacuum level and the Fermi level $E_{F22}$ of the second n-type semiconductor layer 201.

The energy difference between the vacuum level and the Fermi level $E_{F22}$ of the second n-type semiconductor layer 201 is greater than the energy difference between the vacuum level and the Fermi level $E_{F1}$ of the first conductive layer 101.

The energy difference between the vacuum level and the Fermi level $E_{F3}$ of the second conductive layer 103 is greater than the energy difference between the vacuum level and the Fermi level $E_{F21}$ of the first n-type semiconductor layer 102.

When such first conductive layer 101, first n-type semiconductor layer 102, second n-type semiconductor layer 201, and second conductive layer 103 form junctions, as shown in FIG. 7B, the band bending advantageous for charge separation at the interfaces is formed. Since this allows the carriers generated in the first n-type semiconductor layer 102 due the photoexcitation to be separated efficiently, the semiconductor photoelectrode 100 according to the third embodiment has high quantum efficiency.

A specific example of the combination of the first n-type semiconductor layer 102, the second n-type semiconductor layer 201, and the first conductive layer 101 (the first n-type semiconductor layer 102/the second n-type semiconductor layer 201/the first conductive layer 101) is:

$Nb_3N_5/TiO_2/Ti$, $Nb_3N/Nb_2O_5/Ti$, $Nb_3N_5/Ta_2O_5/Ti$,
$Nb_3N_5/TiO_2/Nb$, $Nb_3N_5/Nb_2O_5/Nb$, $Nb_3N_5/Ta_2O_5/Nb$,
$Nb_3N_5/TiO_2/Ta$, $Nb_3N_5/Nb_2O_5/Ta$, $Nb_3N_5/Ta_2O_5/Ta$,

Ta$_3$N$_5$/TiO$_2$/Ti, Ta$_3$N$_5$/Nb$_2$O$_5$/Ti, Ta$_3$N$_5$/Ta$_2$O$_5$/Ti, Ta$_3$N$_5$/TiO$_2$/Nb, Ta$_3$N$_5$/Nb$_2$O$_5$/Nb, Ta$_3$N$_5$/Ta$_2$O$_5$/Nb, Ta$_3$N$_5$/TiO$_2$/Ta, Ta$_3$N$_5$/Nb$_2$O$_5$/Ta, Ta$_3$N$_5$/Ta$_2$O$_5$/Ta, NbON/TiO$_2$/Ti, NbON/Nb$_2$O$_5$/Ti, NbON/Ta$_2$O$_5$/Ti, NbON/TiO$_2$/Nb, NbON/Nb$_2$O$_5$/Nb, NbON/Ta$_2$O$_5$/Nb, NbON/TiO$_2$/Ta, NbON/Nb$_2$O$_5$/Ta, NbON/Ta$_2$O$_5$/Ta, TaON/TiO$_2$/Ti, TaON/Nb$_2$O$_5$/Ti, TaON/Ta$_2$O$_5$/Ti, TaON/TiO$_2$/Nb, TaON/Nb$_2$O$_5$/Nb, TaON/Ta$_2$O$_5$/Nb, TaON/TiO$_2$/Ta, TaON/Nb$_2$O$_5$/Ta, or TaON/Ta$_2$O$_5$/Ta.

It is desirable that the second n-type semiconductor layer 201 is formed of at least one selected from the group consisting of an oxide semiconductor, a nitride semiconductor, and an oxynitride semiconductor. It is desirable that the semiconductor which constitutes the second n-type semiconductor layer 201 contains at least one kind of element selected from the group consisting of Ti, Nb and Ta.

Similarly to the case shown in FIG. 4A and FIG. 4B, the electrons and the holes generated in the first n-type semiconductor layer 102 due to the photoexcitation are separated from each other more efficiently in a case where the semiconductor photoelectrode 100 comprises the second n-type semiconductor layer 201 than in a case where the first n-type semiconductor layer 102 has a uniform composition as shown in FIG. 2A and FIG. 2B.

Fourth Embodiment

In the fourth embodiment, the first p-type semiconductor layer 152 is used instead of the first n-type semiconductor layer 102. Furthermore, similarly to the case of the third embodiment, a second p-type semiconductor layer 252 is interposed between the first conductive layer 101 and the first n-type semiconductor layer 102. In the fourth embodiment, not only the appropriate relations of the Fermi levels and the band edge levels described in the second embodiment but also the following appropriate relations of the Fermi levels and the band edge levels are satisfied.

The band edge level $E_{G22}$ of the conduction band of the second p-type semiconductor layer 252 is higher than the band edge level $E_{G21}$ of the conduction band of the first p-type semiconductor layer 152.

The band edge level $E_{V22}$ of the valence band of the second p-type semiconductor layer 252 is higher than the band edge level $E_{V21}$ of the valence band of the first p-type semiconductor layer 152.

The Fermi level $E_{F21}$ of the first p-type semiconductor layer 152 is higher than the Fermi level $E_{F22}$ of the second p-type semiconductor layer 252.

The Fermi level $E_{F22}$ of the second p-type semiconductor layer 252 is higher than the Fermi level $E_{F1}$ of the first conductive layer 101.

The Fermi level $E_{F3}$ of the second conductive layer 103 is higher than the Fermi level $E_{F21}$ of the first p-type semiconductor layer 152.

Figure 8A:
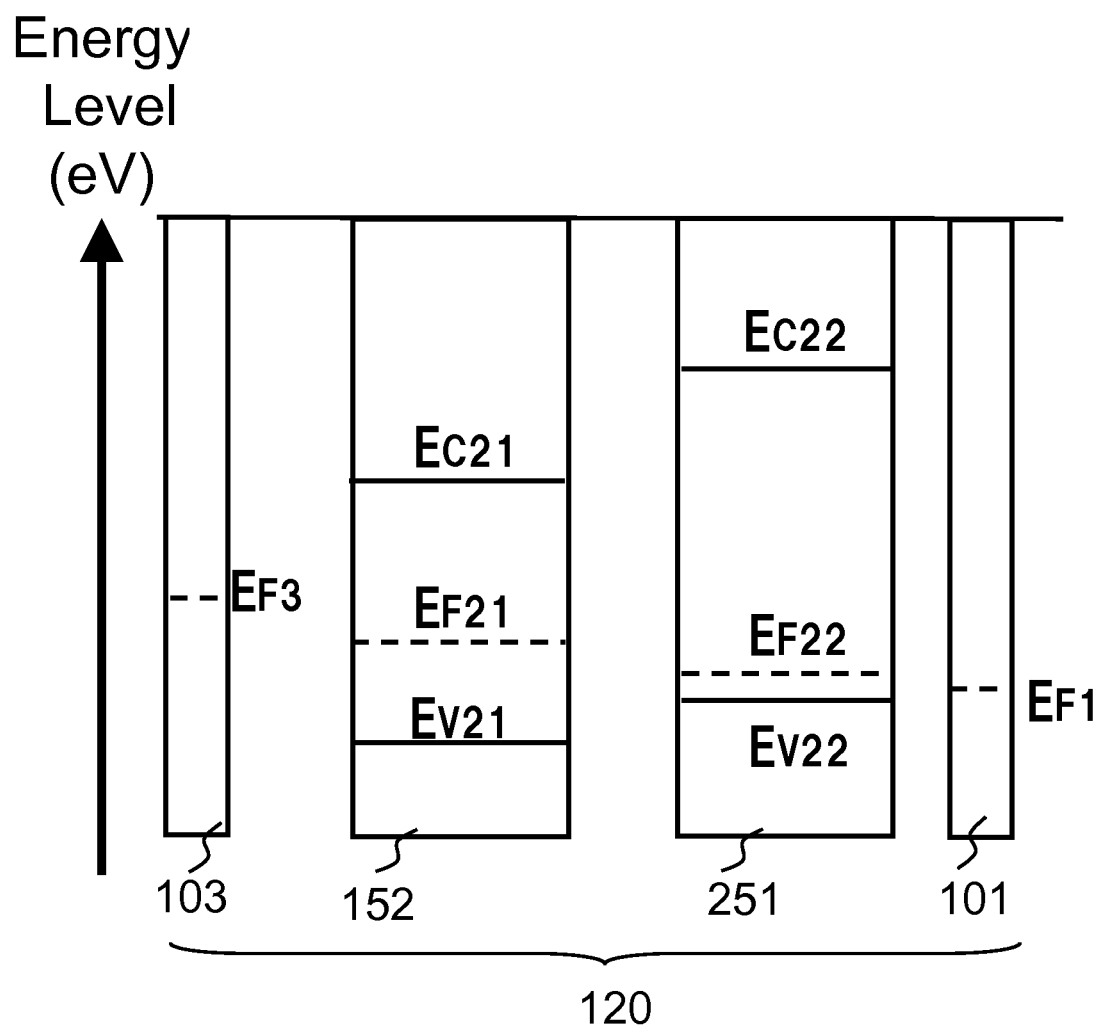
FIG. 8A shows a schematic view of the band structure before the first conductive layer 101, the first p-type semiconductor layer 152, a second p-type semiconductor layer 252, and the second conductive layer 103 form junctions in the fourth embodiment.
Figure 8B:
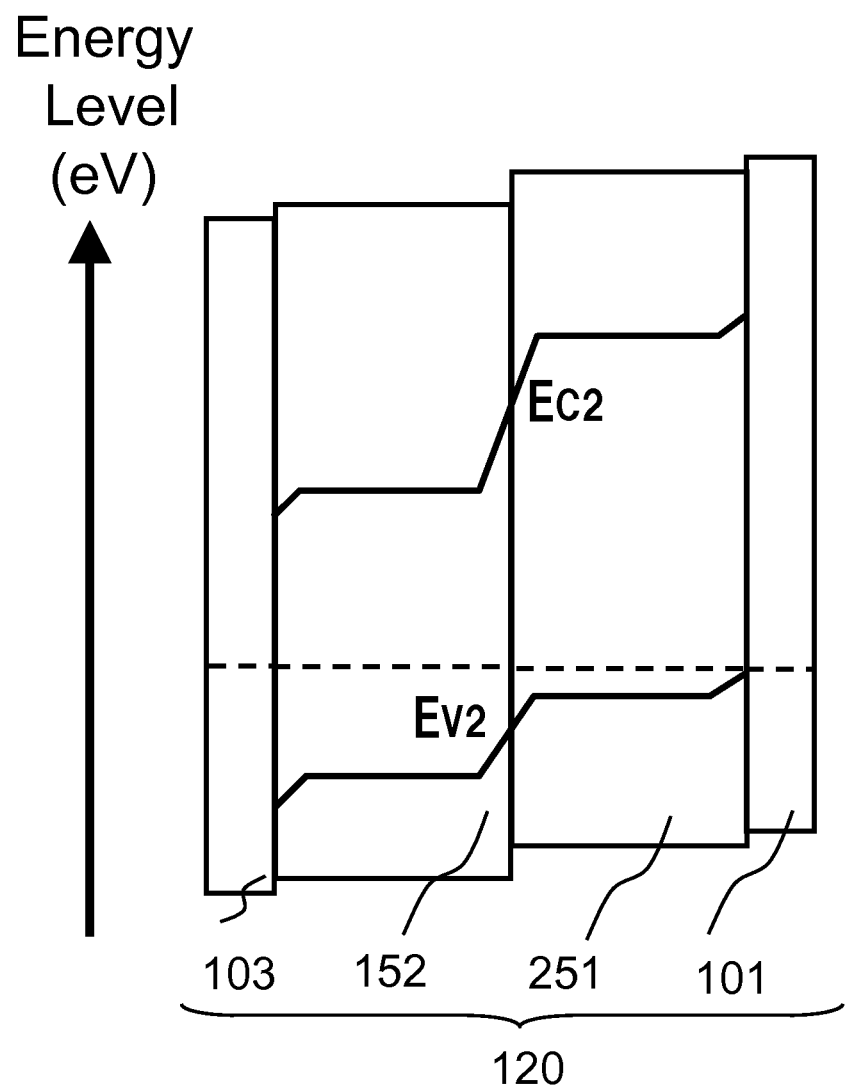
FIG. 8B shows a schematic view of the band structure after the first conductive layer 101, the first p-type semiconductor layer 152, the second p-type semiconductor layer 252, and the second conductive layer 103 have formed junctions in the fourth embodiment.

FIG. 8A shows a schematic view of the band structure before the first conductive layer 101, the first p-type semiconductor layer 152, the second p-type semiconductor layer 252, and the second conductive layer 103 form junctions in the fourth embodiment. FIG. 8B shows a schematic view of the band structure after the first conductive layer 101, the first p-type semiconductor layer 152, the second p-type semiconductor layer 252, and the second conductive layer 103 have formed junctions in the fourth embodiment. FIG. 8A and FIG. 8B correspond to FIG. 7A and FIG. 7B, respectively.

Next, a desirable semiconductor photoelectrode 100 according to the present invention will be described.

As shown in FIG. 6, in the desirable semiconductor photoelectrode 100 according to the present invention, the first conductive layer 101, the second n-type semiconductor layer 201, the first n-type semiconductor layer 102, and the second conductive layer 103 are formed of Nb, Nb$_2$O$_5$, Nb$_3$N$_5$, and NiO, respectively.

In this semiconductor photoelectrode 100, the first n-type semiconductor layer 102 formed of niobium nitride represented by the chemical formula Nb$_3$N$_5$ absorbs the incident light. As a result, electrons and holes are generated in the first n-type semiconductor layer 102. Since niobium nitride represented by the chemical formula Nb$_3$N$_5$ has a bandgap of approximately 780 nanometers, almost all of the light is used for hydrogen generation due to water splitting. In light of the overvoltage required for both hydrogen generation reaction and oxygen generation reaction, it is desirable that the first n-type semiconductor layer 102 has a bandgap of more than approximately 780 nanometers for the achievement of the high efficiency. For this reason, it is believed that niobium nitride represented by the chemical formula Nb$_3$N$_5$ is most suitable as the material of the first n-type semiconductor layer 102.

The appropriate band bending is formed in the second n-type semiconductor layer 201 to separate the electrons and holes generated in the first n-type semiconductor layer 102 formed of niobium nitride represented by the chemical formula Nb$_3$N$_5$ from each other. Furthermore, the second n-type semiconductor layer 201 functions as a path for the electrons migrating to the first conductive layer 101. For this reason, it is believed that niobium oxide represented by the chemical formula Nb$_2$O$_5$ is most suitable as the material of the second n-type semiconductor layer 201 from the viewpoint of its Fermi level, its band edge level at the bottom of the conduction band, and its band edge level at the top of the valence band and from the viewpoint of process for the formation of the first n-type semiconductor layer 102 formed of the niobium nitride represented by the chemical formula Nb$_3$N$_5$. It is desirable that the second n-type semiconductor layer 201 is as thin as possible in view of the decrease of the probability of the recombination of the migrating electrons with holes. In light of an actual fabrication process, the second n-type semiconductor layer 201 may have a thickness which falls within a range of not less than 10 nanometers and less than 100 nanometers.

The first conductive layer 101 is required to form an ohmic contact with the second n-type semiconductor layer 201 formed of niobium oxide represented by the chemical formula Nb$_2$O$_5$. For this reason, niobium represented by the chemical formula Nb is most suitable as the material of the first conductive layer 101 from the viewpoint of the work function and from the viewpoint of the process for the formation of the second n-type semiconductor layer 201 formed of niobium oxide represented by the chemical formula Nb$_2$O$_5$.

Furthermore, the second n-type semiconductor layer 201 functions as a path for the holes migrating to the second conductive layer 103. The second conductive layer 103 prevents the first n-type semiconductor layer 102 from being in contact with the electrolyte aqueous solution. In order to raise the efficiency of the light absorption by the first n-type semiconductor layer 102, it is desirable to decrease the light absorption efficiency in the second conductive layer 103. For this reason, it is desirable that the second conductive layer 103 is formed of a material having high transparency. From the viewpoint of both its Fermi level and light absorption, it is believed that nickel oxide represented by the chemical formula NiO is most suitable as the material of the second conductive layer 103.

Fifth Embodiment

Figure 9:
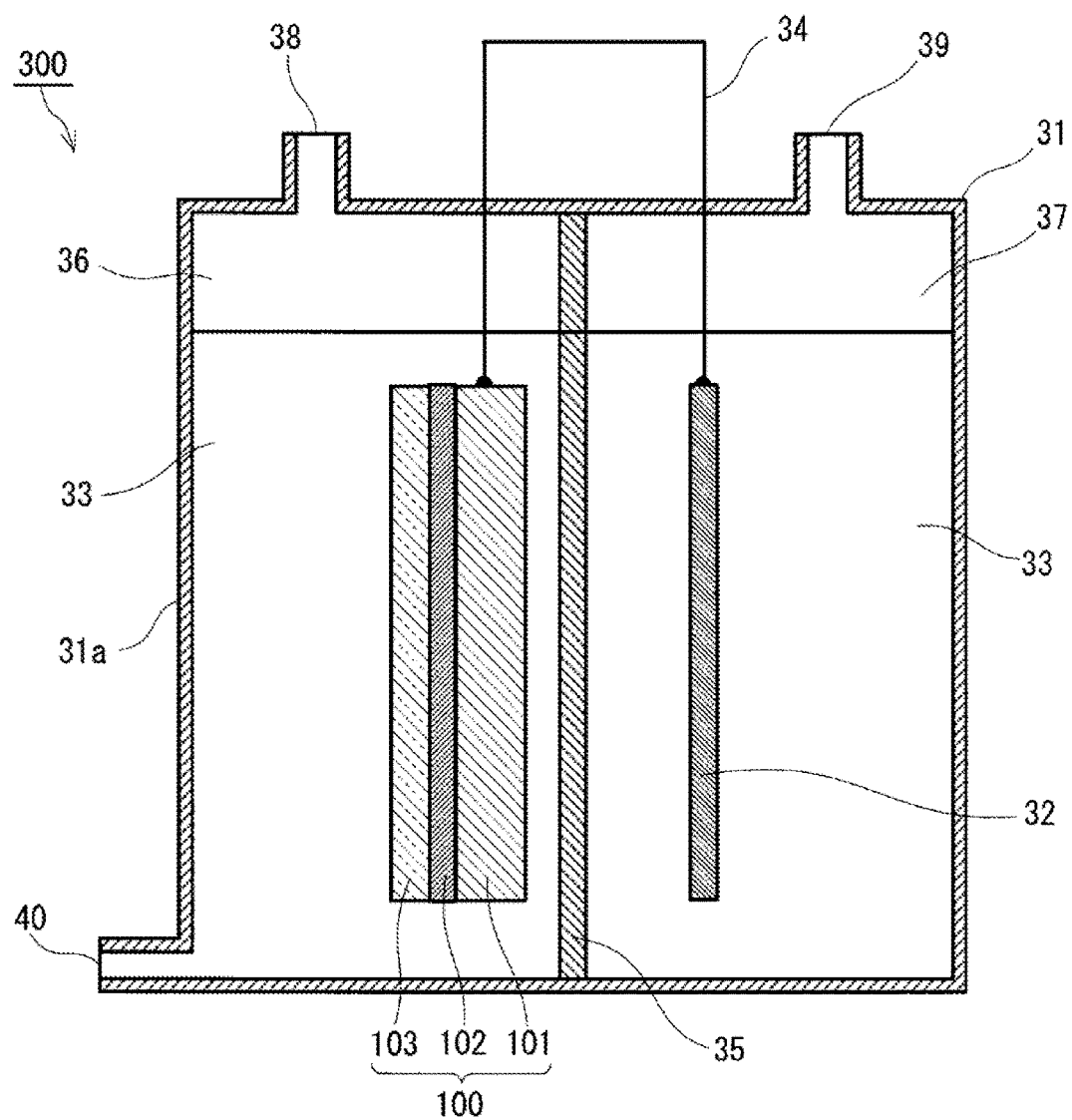
FIG. 9 shows a cross-sectional view of a photoelectrochemical cell 300 according to the fifth embodiment.

FIG. 9 shows a cross-sectional view of a photoelectrochemical cell 300 according to the fifth embodiment. The photoelectrochemical cell 300 according to the fifth embodiment comprises a container 31, the semiconductor photoelectrode 100 stored in the container 31, a counter electrode 32, and a separator 35, as shown in FIG. 9. The inside of the container 31 is separated with the separator 35 into a first chamber 36 and a second chamber 37. The semiconductor photoelectrode 100 is contained in the first chamber 36. The counter electrode 32 is contained in the second chamber 37. An electrolyte aqueous solution 33 is stored in the first chamber 36 and the second chamber 37. The separator 35 does not have to be provided.

The semiconductor electrode 100 is disposed at a position where the semiconductor electrode 100 is in contact with the electrolyte aqueous solution 33 in the first chamber 36. The semiconductor photoelectrode 100 comprises the first conductive layer 101, the first n-type semiconductor layer 102, and the second conductive layer 103, as described in the first embodiment.

The first chamber 36 comprises a first outlet 38 and a water supply inlet 40. Oxygen generated in the first chamber 36 is exhausted through the first outlet 38. Water is supplied through the water supply inlet 40 into the first chamber 36. A part of the container 31 opposite to the second conductive layer 103 is referred to as a light incident part 31a. The light incident part 31a is composed of a material through which light such as sunlight travels. An example of the material of the container 31 is Pyrex glass (registered trademark) or acrylic resin.

On the other hand, the counter electrode 32 is disposed at a position where the counter electrode 32 is in contact with the electrolyte aqueous solution 33 in the second chamber 37. The second chamber 37 comprises a second outlet 39. Hydrogen generated in the second chamber 37 is exhausted through the second outlet 39.

The first conductive layer 101 is electrically connected to the counter electrode 32 through a conducting wire 34.

The electrolyte aqueous solution 33 is acidic or alkaline. The electrolyte aqueous solution 33 may be always stored in the container 31. Instead, the electrolyte aqueous solution 33 may be supplied to the container 31 only in use.

The electrolyte aqueous solution 33 passes through the separator 35. However, the separator 35 prevents a gas generated in the first chamber 36 from being mixed with a gas generated in the second chamber 37. An example of the material of the separator 35 is a solid electrolyte such as a polymer solid electrolyte. An example of the polymer solid electrolyte is an ion exchange membrane such as Nafion (registered trademark). The separator 35 divides the inside of the container 31 into the first chamber 36 and the second chamber 37. In the first chamber 36, the semiconductor photoelectrode 100 is in contact with the electrolyte aqueous solution 33. In the second chamber 37, the counter electrode 32 is in contact with the electrolyte aqueous solution 33. The separator 35 allows oxygen and hydrogen generated in the container 31 to be easily separated from each other.

Next, the operation of the photoelectrochemical cell 300 according to the fifth embodiment will be described.

Figure 10:
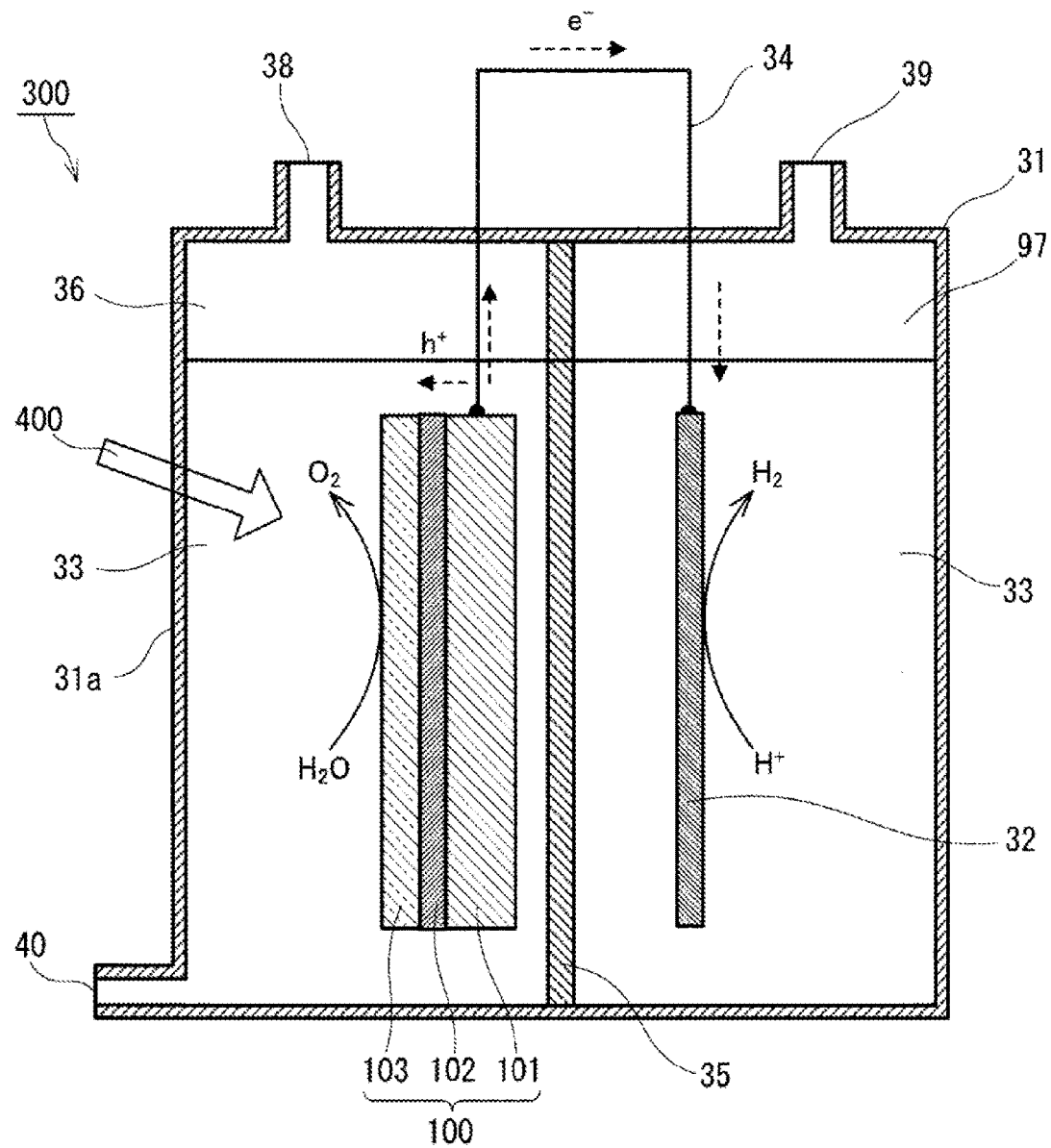
FIG. 10 shows a cross-sectional view of an operating state of the photoelectrochemical cell 300 shown in FIG. 9.

As shown in FIG. 10, light such as sunlight is incident on the semiconductor photoelectrode 100 through the light incident part 31a. The light reaches the first n-type semiconductor layer 102 through the second conductive layer 103. Electrons and holes are generated in the conduction band and in the valence band of the first n-type semiconductor layer 102, respectively. The generated holes migrate to the outermost surface of the second conductive layer 103. Water is split at the outermost surface of the second conductive layer 103 as shown in the following reaction formula (2). As a result, oxygen is generated. On the other hand, the generated electrons migrate to the first conductive layer 101 along the band bending of the conduction band of the first n-type semiconductor layer 102. The electrons which have reached the first conductive layer 101 flow to the counter electrode 32 through the conducting wire 34. In this way, hydrogen is generated on the surface of the counter electrode 32 as shown in the following reaction formula (3).

$$4h^+ + 2H_2O \rightarrow O_2\uparrow + 4H^+ \qquad (2)$$

$$4e^- + 4H^+ \rightarrow 2H_2\uparrow \qquad (3)$$

where $h^+$ represents a hole.

Since the photoelectrochemical cell 300 according to the fifth embodiment comprises the semiconductor photoelectrode 100 described in the first to fourth embodiments, the photoelectrochemical cell 300 realizes high quantum efficiency for the water-splitting reaction. Furthermore, the photoelectrochemical cell 300 according to the fifth embodiment has higher long-term stability than a conventional photoelectrochemical cell.

Sixth Embodiment

Figure 11:
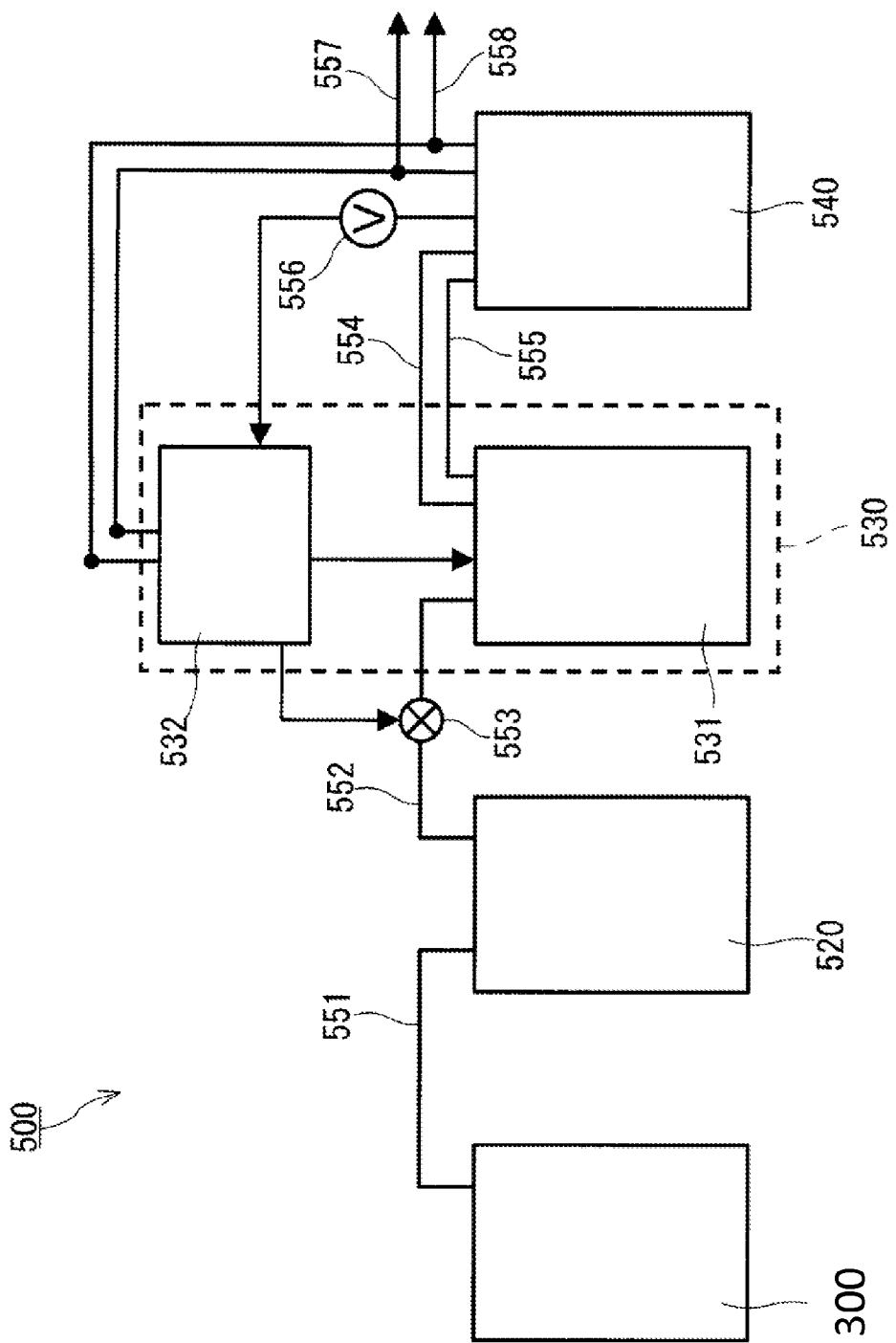
FIG. 11 shows a schematic view of an energy system according to the sixth embodiment.
Figure 12:
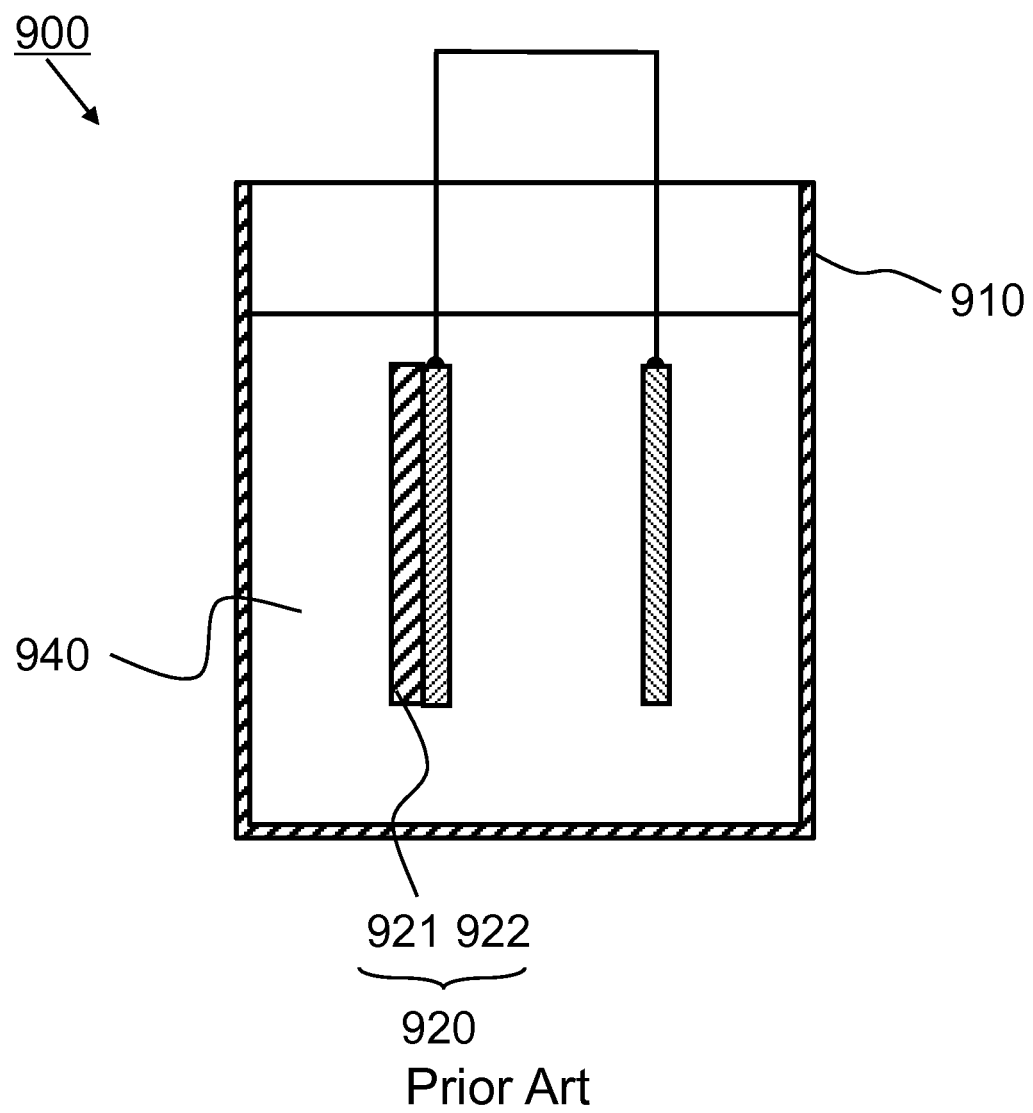
FIG. 12 shows a photoelectrochemical cell disclosed in U.S. Pat. No. 8,236,146.

FIG. 11 shows a schematic view of an energy system 500 according to the sixth embodiment.

The energy system 500 according to the sixth embodiment comprises the photoelectrochemical cell 300, a hydrogen reservoir 520, a fuel cell 530, and a battery 540, as shown in FIG. 11.

The hydrogen reservoir 520 is connected to the photoelectrochemical cell 300 through a first pipe 551. The hydrogen reservoir 520 may comprise a compressor for compressing hydrogen and a high pressure hydrogen cylinder for storing hydrogen compressed by the compressor.

The fuel cell 530 comprises an electric power generation part 531 and a fuel cell control part 532 for controlling the electric power generation part 531. The fuel cell 530 is connected to the hydrogen reservoir 520 through a second pipe 552. The second pipe 552 is provided with an isolation valve 553. An example of the fuel cell 530 is a polymer solid electrolyte fuel cell.

A positive electrode and a negative electrode of the battery 540 are electrically connected to the positive electrode and the negative electrode of the electric power generation part 531 through a first wiring 554 and a second wiring 555, respectively. The battery 540 may be provided with a capacity measurement part 556 for measuring the remaining capacity of the battery 540. An example of the battery 540 is a lithium ion battery.

Next, the operation of the energy system 500 according to the sixth embodiment will be described.

Hydrogen generated in the photoelectrochemical cell 300 is supplied into the hydrogen reservoir 520 through the first pipe 551.

When the fuel cell 530 generates electric power, the isolation valve 553 is opened on the basis of the signal transmitted from the fuel cell control part 532. In this way, hydrogen stored in the hydrogen reservoir 520 is supplied to the electric power generation part 531 through the second pipe 552.

The electric power generated in the electric power generation part 531 is stored in the battery 540 through the first wiring 554 and the second wiring 555. The electric power stored in the battery 540 is supplied to a house or a company through a third wiring 557 and a fourth wiring 558.

The photoelectrochemical cell 300 realizes high quantum efficiency for the water-splitting reaction. Furthermore, the photoelectrochemical cell 300 has higher long-term stability than a conventional photoelectrochemical cell. For this reason, the energy system 500 comprising such a photoelectrochemical cell 300 supplies electric power efficiently. Furthermore, the energy system 500 has higher long-term stability than a conventional energy system.

EXAMPLES

Hereinafter, the present invention will be described with reference to the following examples.

Inventive Example 1

In the inventive example 1, a semiconductor photoelectrode 100 shown in FIG. 1 was fabricated as below. The semiconductor photoelectrode 100 according to the inventive example 1 comprised the first conductive layer 101 formed of tantalum represented by the chemical formula Ta, the first n-type semiconductor layer 102 formed of tantalum nitride represented by the chemical formula $Ta_3N_5$ and the second conductive layer 103 formed of nickel oxide represented by the chemical formula NiO.

First, a film formed of tantalum oxide represented by the chemical formula $Ta_2O_5$ (hereinafter, referred to as "tantalum oxide film") was formed on a Ta substrate by a reactive sputtering method. The Ta substrate had a thickness of 0.3 millimeters. In the reactive sputtering method, a target formed of tantalum oxide represented by the chemical formula $Ta_2O_5$ was used, and a reactive gas containing argon and oxygen was supplied to a chamber. The tantalum oxide film had a thickness of 150 nanometers. In this way, a tantalum oxide substrate was obtained.

Then, the tantalum oxide substrate was set on an alumina substrate. The alumina substrate was heated from room temperature to 900 degrees Celsius under a nitrogen gas flow. Subsequently, the gas flow was substituted with an ammonia gas flow, and the alumina substrate was cooled. After the alumina substrate was cooled to 300 degrees Celsius, the ammonia gas flow was substituted with a nitrogen gas flow. In this way, tantalum oxide represented by the chemical formula $Ta_2O_5$ was turned into tantalum nitride represented by the chemical formula $Ta_3N_5$. As a result, obtained was a tantalum nitride substrate in which a film formed of tantalum nitride represented by the chemical formula $Ta_3N_5$ (hereinafter, referred to as "tantalum nitride film") was formed on the Ta substrate.

A film formed of nickel oxide represented by the chemical formula NiO (hereinafter, referred to as "NiO film") was formed on the tantalum nitride substrate by a reactive sputtering method. In the reactive sputtering method, a target formed of nickel represented by the chemical formula Ni was used, and a reactive gas containing argon and oxygen was supplied to a chamber. The NiO film had a thickness of approximately 10 nanometers. In this way, the semiconductor photoelectrode 100 according to the inventive example 1 was obtained. The semiconductor photoelectrode 100 according to the inventive example 1 had a stacked structure of NiO/$Ta_3N_5$/Ta.

A photocurrent was measured using the semiconductor photoelectrode 100 according to the inventive example 1. In the measurement of the photocurrent, visible light having a wavelength of 500 nanometers was used as a source of light. The electrolyte aqueous solution was a sodium hydroxide aqueous solution having a concentration of 0.1M. The counter electrode was a Pt electrode. Just after the measurement of the photocurrent was started, a value of the photocurrent density (J0) was measured. Hereinafter, this value (J0) is referred to as an initial photocurrent density. Furthermore, after one hour had elapsed from the start of the measurement of the photocurrent, a value of the photocurrent density (J) was measured. Hereinafter, this value (J) is referred to as a photocurrent density one hour later. The long-term stability was evaluated by the value of J/J0. Table 1 shows the result.

Inventive Example 2

In the inventive example 2, the semiconductor photoelectrode 100 shown in FIG. 6 was fabricated as below. The semiconductor photoelectrode 100 according to the inventive example 2 comprised the first conductive layer 101 formed of tantalum represented by the chemical formula Ta, the second n-type semiconductor layer 201 formed of tantalum oxide represented by the chemical formula $Ta_2O_5$, the first n-type semiconductor layer 102 formed of tantalum nitride represented by the chemical formula $Ta_3N_5$, and the second conductive layer 103 formed of nickel oxide represented by the chemical formula NiO Similarly to the case of the inventive example 1, prepared was a tantalum oxide substrate in which a tantalum oxide film was formed on a Ta substrate. Then, the tantalum oxide film was azotized using an ammonia gas by a similar procedure to the inventive example 1. The time during which the ammonia gas was supplied in the inventive example 2 was shorter than the time during which the ammonia gas was supplied in the inventive example 1. For this reason, a front surface part of the tantalum oxide film was turned into a tantalum nitride film; however, unlike in the case of the inventive example 1, a reverse surface part of the tantalum oxide film remained unchanged. In this way, a stacked structure of the tantalum nitride film/the tantalum oxide film/the Ta substrate was obtained. The composition ratio of tantalum nitride represented by the chemical formula $Ta_3N_5$ to tantalum oxide represented by the chemical formula $Ta_2O_5$ was varied continuously along the thickness direction of the stacked structure. Specifically, the composition ratio of $Ta_3N_5$ was greater at the surface of the stacked structure, whereas the composition ratio of $Ta_2O_5$ was greater near the Ta substrate. Then, an NiO film was formed on the tantalum nitride film by a reactive sputtering method using a target formed of Ni by a similar process to the inventive example 1. In this way, a semiconductor photoelectrode 100 according to the inventive example 2 was obtained. The semiconductor photoelectrode 100 according to the inventive example 2 had a stacked structure of NiO/$Ta_3N_5$/$Ta_2O_5$/Ta. Similarly to the case of the inventive example 1, a photocurrent was measured using the semiconductor photoelectrode 100 according to the inventive example 2.

Comparative Example 1

A semiconductor photoelectrode 100 was fabricated similarly to the inventive example 1, except that the NiO film was not formed in the comparative example 1. The semiconductor photoelectrode 100 according to the comparative example 1 had a stacked structure of $Ta_3N_5/Ta$. Similarly to the case of the inventive example 1, a photocurrent was measured using the semiconductor photoelectrode 100 according to the comparative example 1.

TABLE 1

| | Stacked structure | Initial photocurrent Density (J0) | Photocurrent density one hour later (J) | Long-term stability Index (J/J0) |
|---|---|---|---|---|
| Inventive example 1 | $NiO/Ta_3N_5/Ta$ | 5.0 μm/cm² | 3.5 μm/cm² | 0.7 |
| Inventive example 2 | $NiO/Ta_3N_5/Ta_2O_5/Ta$ | 10 μm/cm² | 7.0 μm/cm² | 0.7 |
| Comparative example 1 | $Ta_3N_5/Ta$ | 7.0 μm/cm² | 1.4 μm/cm² | 0.2 |

As is clear from Table 1, the long-term stability was improved in a case where the front surface of the tantalum nitride film was covered with the NiO film. The initial photocurrent density (J0) measured in the inventive example 2 was higher than the initial photocurrent density (J0) measured in the inventive example 1. This means that the water-splitting reaction efficiency was improved since the band bending suitable for the charge separation was formed in the semiconductor layer by using the semiconductor layer composed of the stacked structure including the tantalum nitride film and tantalum oxide film.

INDUSTRIAL APPLICABILITY

The semiconductor photoelectrode according to the present invention can be used to split water with high efficiency by irradiating it with light. Furthermore, the high quantum efficiency is maintained for a long term in the semiconductor photoelectrode according to the present invention. Hydrogen can be obtained using such a semiconductor photoelectrode. The obtained hydrogen can be used for a fuel cell.

REFERENTIAL SIGNS LIST 100 semiconductor photoelectrode
101 first conductive layer
102 first n-type semiconductor layer
102a first n-type surface region
102b second n-type surface region
103 second conductive layer
152 first p-type semiconductor layer
152a first p-type surface region
152b second p-type surface region
201 second n-type semiconductor layer
252 second p-type semiconductor layer
300 photoelectrochemical cell
31 container
31a light incident part
32 counter electrode
33 electrolyte aqueous solution
34 conducting wire
35 separator
36 first chamber
37 second chamber
38 first outlet
39 second outlet
40 water supply inlet
500 energy system
520 hydrogen reservoir
530 fuel cell
540 battery

The invention claimed is:
1. A semiconductor photoelectrode, comprising:
a first conductive layer;
a first n-type semiconductor layer disposed on the first conductive layer; and
a second conductive layer covering the first n-type semiconductor layer,
wherein
the first n-type semiconductor layer has a first n-type surface region and a second n-type surface region;
the first n-type surface region is in contact with the first conductive layer;
the second n-type surface region is in contact with the second conductive layer;
a band edge level $E_{C2a}$ of a conduction band of the first n-type surface region is not higher than a band edge level $E_{C2b}$ of a conduction band of the second n-type surface region;
a band edge level $E_{V2a}$ of a valence band of the first n-type surface region is not higher than a band edge level $E_{V2b}$ of a valence band of the second n-type surface region;
a Fermi level $E_{F2b}$ of the second n-type surface region is not higher than a Fermi level $E_{F2a}$ of the first n-type surface region;
the Fermi level $E_{F2a}$ of the first n-type surface region is lower than a Fermi level $E_{F1}$ of the first conductive layer;
a Fermi level $E_{F3}$ of the second conductive layer is lower than the Fermi level $E_{F2b}$ of the second n-type surface region;
the first n-type semiconductor layer is formed of at least one selected from the group consisting of a nitride semiconductor and an oxynitride semiconductor;
the second conductive layer is light-transmissive; and
the second conductive layer is formed of a p-type oxide conductor.
2. The semiconductor photoelectrode according to claim 1, wherein
the nitride semiconductor and the oxynitride semiconductor each contain a metal selected from the group consisting of Ti, Nb, and Ta.
3. The semiconductor photoelectrode according to claim 1, wherein
the first n-type semiconductor layer is composed of two or more kinds of elements; and
a concentration of the at least one kind of the element included in the first n-type semiconductor layer is increased or decreased along a thickness direction of the first n-type semiconductor layer.
4. The semiconductor photoelectrode according to claim 1, further comprising:
a second n-type semiconductor layer,
wherein
the second n-type semiconductor layer is interposed between the first conductive layer and the first n-type semiconductor layer;
a band edge level of a conduction band $E_{C22}$ of the second n-type semiconductor layer is lower than a band edge level of a conduction band $E_{C21}$ of the first n-type semiconductor layer;

a band edge level of a valence band $E_{V22}$ of the second n-type semiconductor layer is lower than a band edge level of a valence band $E_{V21}$ of the first n-type semiconductor layer;

a Fermi level $E_{F21}$ of the first n-type semiconductor layer is lower than a Fermi level $E_{F22}$ of the second n-type semiconductor layer;

the Fermi level $E_{F22}$ of the second n-type semiconductor layer is lower than the Fermi level $E_{F1}$ of the first conductive layer; and the Fermi level $E_{F3}$ of the second conductive layer is lower than the Fermi level $E_{F22}$ of the first n-type semiconductor layer.

5. The semiconductor photoelectrode according to claim 4, wherein
the first n-type semiconductor layer is formed of a nitride or oxynitride semiconductor containing a metal selected from the group consisting of Ti, Nb and Ta.

6. The semiconductor photoelectrode according to claim 5, wherein
the second n-type semiconductor layer is formed of an oxide, nitride, or oxynitride semiconductor containing a metal selected from the group consisting of Ti, Nb and Ta.

7. The semiconductor photoelectrode according to claim 6, wherein
the metal selected from the group consisting of Ti, Nb, and Ta contained in the first n-type semiconductor layer is the same as the metal selected from the group consisting of Ti, Nb, and Ta contained in the second n-type semiconductor layer.

8. The semiconductor photoelectrode according to claim 1, wherein
the p-type oxide conductor is formed of a material selected from the group consisting of p-type nickel oxide, p-type copper oxide, p-type cobalt oxide, p-type zinc oxide, p-type $CuNbO_3$, p-type $SrCu_2O_2$, p-type BaCuSeF, and p-type $CuAlO_2$.

9. The semiconductor photoelectrode according to claim 8, wherein
the p-type oxide conductor is formed of p-type nickel oxide.

10. A photoelectrochemical cell, comprising:
the semiconductor photoelectrode according to claim 1;
a counter electrode electrically connected to the first conductive layer included in the semiconductor photoelectrode;
an electrolyte aqueous solution in contact with surfaces of the semiconductor photoelectrode and the counter electrode; and
a container containing the semiconductor photoelectrode, the counter electrode, and the electrolyte aqueous solution.

11. A method for generating hydrogen, the method comprising:
(a) preparing the photoelectrochemical cell according to claim 10; and
(b) irradiating the semiconductor photoelectrode included in the photoelectrochemical cell with light to generate hydrogen on the counter electrode included in the photoelectrochemical cell.

12. An energy system, comprising:
the photoelectrochemical cell according to claim 10;
a hydrogen reservoir for storing hydrogen generated in the photoelectrochemical cell,
a first pipe for connecting the hydrogen reservoir to the photoelectrochemical cell;
a fuel cell for converting hydrogen stored in the hydrogen reservoir into electric power; and
a second pipe for connecting the fuel cell to the hydrogen reservoir.

* * * * *